(12) United States Patent
Jacobsen et al.

(10) Patent No.: US 8,616,176 B2
(45) Date of Patent: Dec. 31, 2013

(54) ROTARY INTERNAL COMBUSTION ENGINE

(75) Inventors: Sam J. Jacobsen, Middleton, WI (US); David G. Savich, legal representative, Bonita, CA (US); Craig H. Melter, Middleton, WI (US)

(73) Assignee: Sumner Properties, LLC, Madison, WI (US)

( * ) Notice: Subject to any disclaimer, the term of this patent is extended or adjusted under 35 U.S.C. 154(b) by 766 days.

(21) Appl. No.: 12/764,300

(22) Filed: Apr. 21, 2010

(65) Prior Publication Data

US 2011/0259296 A1    Oct. 27, 2011

(51) Int. Cl.
    *F02B 53/04*    (2006.01)
(52) U.S. Cl.
    USPC ........... 123/232; 123/212; 123/215; 123/238; 418/196
(58) Field of Classification Search
    USPC ............... 123/212–215, 232, 238; 418/196
    See application file for complete search history.

(56) References Cited

U.S. PATENT DOCUMENTS

| | | | |
|---|---|---|---|
| 103,733 A | 5/1870 | Gilchrist | |
| 1,923,500 A * | 8/1933 | Northey | 123/214 |
| 2,787,161 A | 4/1957 | Hrycan | |
| 2,870,752 A * | 1/1959 | Breelle | 123/246 |
| 2,920,610 A * | 1/1960 | Breelle | 123/246 |
| 2,920,814 A * | 1/1960 | Breelle | 417/348 |
| 3,203,406 A * | 8/1965 | Dettwiler | 123/238 |
| 3,550,565 A | 12/1970 | Sanchez | |
| 3,724,427 A * | 4/1973 | Sauder | 123/204 |
| 3,782,340 A | 1/1974 | Nam | |
| 3,933,131 A | 1/1976 | Smith | |
| 3,935,840 A | 2/1976 | Fisher | |
| 3,990,409 A * | 11/1976 | Beverly | 123/246 |
| 3,993,029 A * | 11/1976 | Eiermann et al. | 123/203 |
| 4,007,715 A * | 2/1977 | Bonnell et al. | 123/239 |
| 4,064,841 A | 12/1977 | Jenkins et al. | |
| 4,236,496 A * | 12/1980 | Brownfield | 123/212 |
| 4,493,188 A * | 1/1985 | Marsh | 60/468 |
| 4,512,302 A * | 4/1985 | Bunce | 123/238 |
| 4,747,762 A * | 5/1988 | Fairbairn | 418/191 |
| 4,782,323 A | 11/1988 | Lucas | |

(Continued)

FOREIGN PATENT DOCUMENTS

| | | | | |
|---|---|---|---|---|
| DE | 2550360 | * | 11/1975 | ............... F01C 1/14 |
| JP | 11173157 A | | 6/1999 | |
| KR | 20040083122 A | | 10/2004 | |

OTHER PUBLICATIONS

International Search Report for PCT/US/2011/032990 Dated Dec. 19, 2011.

*Primary Examiner* — Thomas Denion
*Assistant Examiner* — Thomas Olszewski
(74) *Attorney, Agent, or Firm* — Boyle Fredrickson, S.C.

(57) ABSTRACT

A rotary engine includes a compressor assembly and two power assemblies that receive compressed air from the compressor assembly. Each assembly includes at least two intermeshing rotors. The rotors of the compressor assembly compress air, either alone or in an air/fuel mixture, in a compression chamber located in that assembly. The compressed air is transferred to the expansion chambers of the power assemblies, where fuel is ignited to initiate a power stroke. A line bisecting the axes of the rotors of the compressor assembly is inclined at an acute angle relative to a line bisecting the axes of the rotors of the power assemblies. The power assemblies operate 180° out of phase with respect to one another to minimize power fluctuations in the engine.

21 Claims, 16 Drawing Sheets

(56) References Cited

U.S. PATENT DOCUMENTS

| | | | |
|---|---|---|---|
| 4,867,735 A | 9/1989 | Wogelius | |
| 5,127,377 A | 7/1992 | Yang | |
| 5,220,893 A | 6/1993 | Costa | |
| 5,222,992 A * | 6/1993 | Fleischmann | 123/204 |
| 5,251,596 A | 10/1993 | Westland | |
| 5,429,083 A * | 7/1995 | Becker | 123/222 |
| 5,605,124 A * | 2/1997 | Morgan | 123/222 |
| 6,273,055 B1 * | 8/2001 | White | 123/238 |
| 6,536,403 B1 | 3/2003 | Elsherbini | |
| 6,550,442 B2 | 4/2003 | Garcia | |
| 6,651,609 B2 | 11/2003 | Nagata et al. | |
| 6,772,728 B2 | 8/2004 | Al-hawaj | |
| 6,776,136 B1 * | 8/2004 | Kazempour | 123/243 |
| 7,459,205 B2 | 12/2008 | Philip et al. | |
| 2008/0050262 A1 | 2/2008 | Jacobsen et al. | |
| 2008/0264379 A1 * | 10/2008 | Maeng | 123/212 |
| 2009/0061130 A1 | 3/2009 | Camps | |
| 2009/0255506 A1 * | 10/2009 | Walker | 123/212 |

* cited by examiner

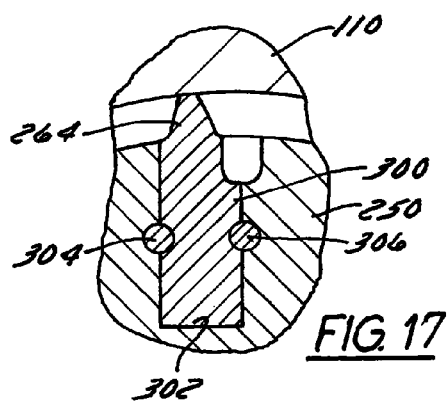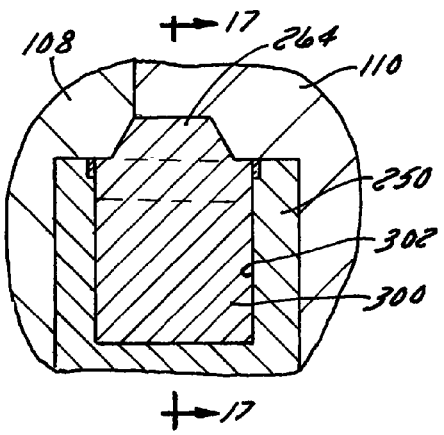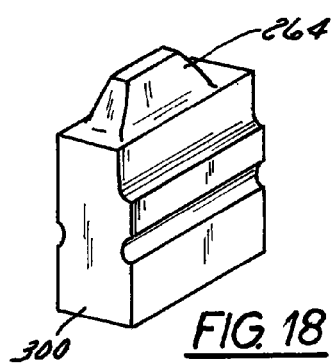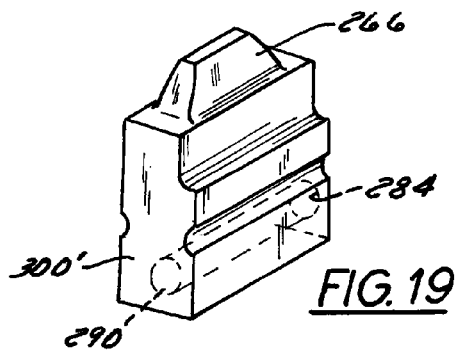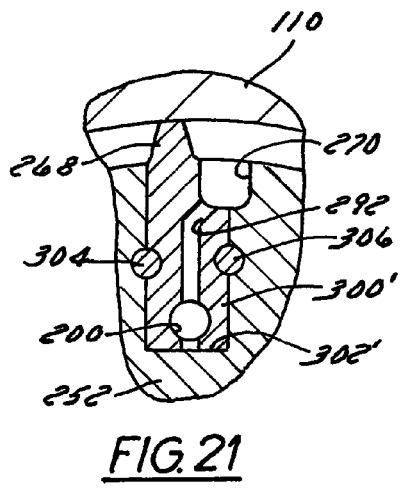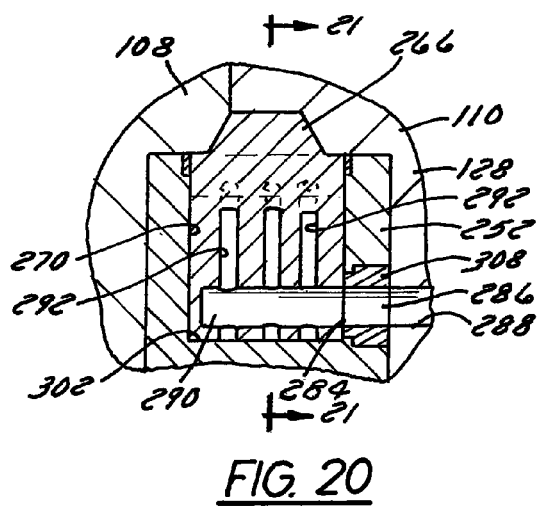

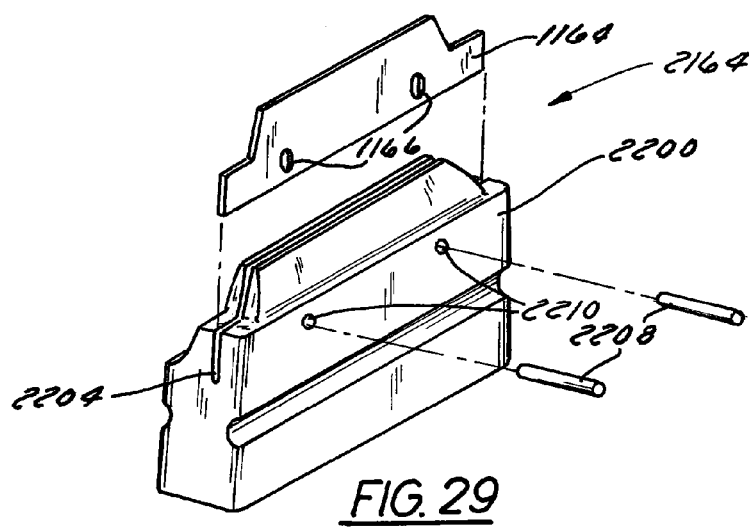
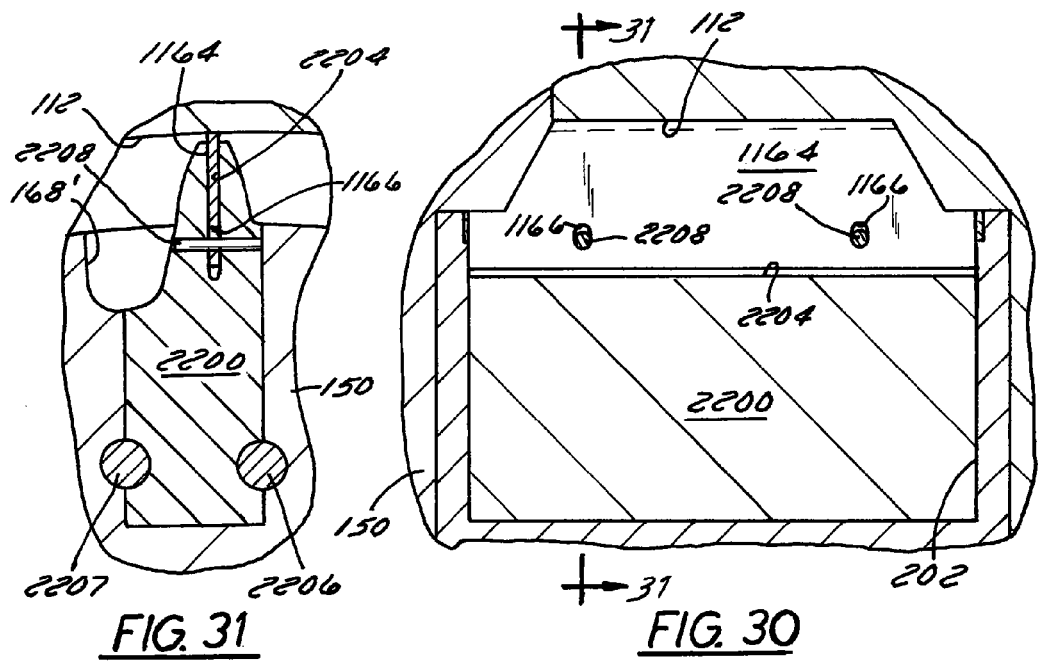

ROTARY INTERNAL COMBUSTION ENGINE

FIELD OF THE INVENTION

The invention relates generally to internal combustion engines and, more particularly, to a rotary internal combustion engine having interconnected compressor and power assemblies, each of which includes intermeshing rotors. The invention additionally relates to a method of operating such an engine.

BACKGROUND OF THE INVENTION

The internal combustion engine, widely used for over 100 years, is by far the most powerful and efficient machine in wide use for generating power and transferring it to a powered element. The internal combustion engine in widest use today is a reciprocating piston engine formed from one or more pistons, each of which is housed in a dedicated cylinder and which reciprocates back and forth in compression and expansion strokes to compress an air-fuel mixture and to generate power upon ignition of the fuel in that mixture. So-called two-stroke engines operate through both a compression stroke and an expansion stroke in each single 360° cycle of piston motion. In so-called four stroke engines, on the other hand, the intake and exhaust strokes in each cylinder are separated from one another by compression and expansion strokes. The engine therefore undergoes a combustion event only during every other cycle of piston movement.

Both types of engines, though highly powerful, suffer the disadvantage of requiring dramatic changes in momentum as the pistons accelerate, decelerate, change direction, and then reaccelerate and decelerate. These changes dramatically reduce the efficiency that could otherwise be achieved by an internal combustion engine, resulting in a reduction of the power-to-weight ratio of the engine. They also induce considerable stress on the engine's components. They also induce vibrations in the engine that induce additional stresses on engine components and accelerate wear. The engine components must be oversized to accommodate the stresses imposed on the engine, further reducing the power-to-weight ratio achievable by the engine.

In order to overcome these disadvantages, rotary engines were developed that were characterized by the powered element taking the form of a rotating rotor as opposed to a reciprocating piston. The best known and most commercially successful such engine is the so-called Wankel engine, which has a three-sided rotor turning on an eccentric shaft. The engine fires once every revolution of the eccentric shaft, so a single rotor is in some ways equivalent to a two-cylinder, four stroke reciprocating engine. The engine produces 12 "strokes" per revolution. A rotary engine of this type is mechanically much simpler than a reciprocating piston engine and is subjected to fewer vibrations. Since it is not subject to the inertia-induced stresses and vibration-induced stresses of a reciprocating piston engine, its components can be considerably less massive, and it therefore has higher power-to-weight ratios than a reciprocating piston engine of comparable output.

However, Wankel and similar rotary engines experienced severe sealing problems due to the fact that a multiple cavity rotor rotates in a cylindrical chamber. They are also prone to flooding problems not experienced by reciprocating piston engines. These and other problems reduced the durability and reliability of the Wankel engine, limiting its commercial success to applications such as high-performance vehicle engines where neither efficiency nor long life were significant considerations.

The need therefore remains for a mechanically simple internal combustion engine having a higher power-to-weight ratio than traditional reciprocating piston engines.

The need also exists for a rotary engine lacking the sealing problems and other problems associated with earlier-known rotary engines.

SUMMARY OF THE INVENTION

In accordance with first aspect of the invention, the above-referenced needs are met by providing a rotary engine having a compressor assembly and at least one power assembly, each of which is formed from at least two intermeshing rotors. The rotors of the compressor assembly compress air in a compression chamber located in that assembly. The air may be or may not be premixed with fuel, depending on whether or not the engine is a carbureted engine or a fuel-injected engine. The compressed air is transferred to an expansion chamber of the power assembly, and fuel that had either been premixed with the air or that is injected into the expansion chamber is ignited to initiate a power stroke. A line bisecting the axes of the rotors of the compressor assembly is inclined at an acute angle relative to a line bisecting the axes of the rotors of the power assembly. This line may be on the order of 45°.

A preferred embodiment of the invention includes two power assemblies that axially flank the compressor assembly. Preferably, first and second lines bisecting the axes of the rotors of the first and second power assemblies, respectively, are parallel to one another.

The rotors of each rotor assembly are at least generally cylindrical and mesh with each other along a single-line contact for the majority of the rotational cycle of the rotor assembly. Each rotor also includes a radially extending lobe that meshes with a radially extending recess in the mating rotor during rotation of the rotor assembly. The rotors of the compressor assembly may have two lobes and two recesses disposed diametrically opposite each other in order to permit the compressor assembly to supply pressurized air to both power assemblies once per revolution of the compressor assembly.

Valves may be reduced in number or eliminated entirely by constructing a porting arrangement between the compression and expansion chambers of the engine to automatically open and close flow passages therebetween at designated points in the rotational cycles of the compression and power assemblies.

In accordance with another aspect of the invention, a rotary engine constructed at least generally as described above is operated with the compressor assembly compressing air for combustion in the power assembly.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIGS. 16-21 are various detail views of the lobes of one of the power assemblies of the engine of FIGS. 1-9;

FIGS. 29-31 are detail views of an alternative lobe configuration usable in the engine of FIGS. 1-9.

DETAILED DESCRIPTION OF THE PREFERRED EMBODIMENTS

A preferred embodiment of the invention will now be described in the form of a spark ignited rotary engine having one compressor assembly and two power assemblies that interact with the compressor assembly. When reading the detailed description of this embodiment that follows, it should be understood that the invention is not so limited. For instance, while two power assemblies are described, the invention is applicable to an invention having a single power assembly. In addition, while the engine is described as a spark ignited engine, the invention is also applicable to compression ignition engines. Other possible alterations to or variations of the engine as described will be discussed at various points in this description, it being understood that still other variations and alterations are possible.

Figure 1:
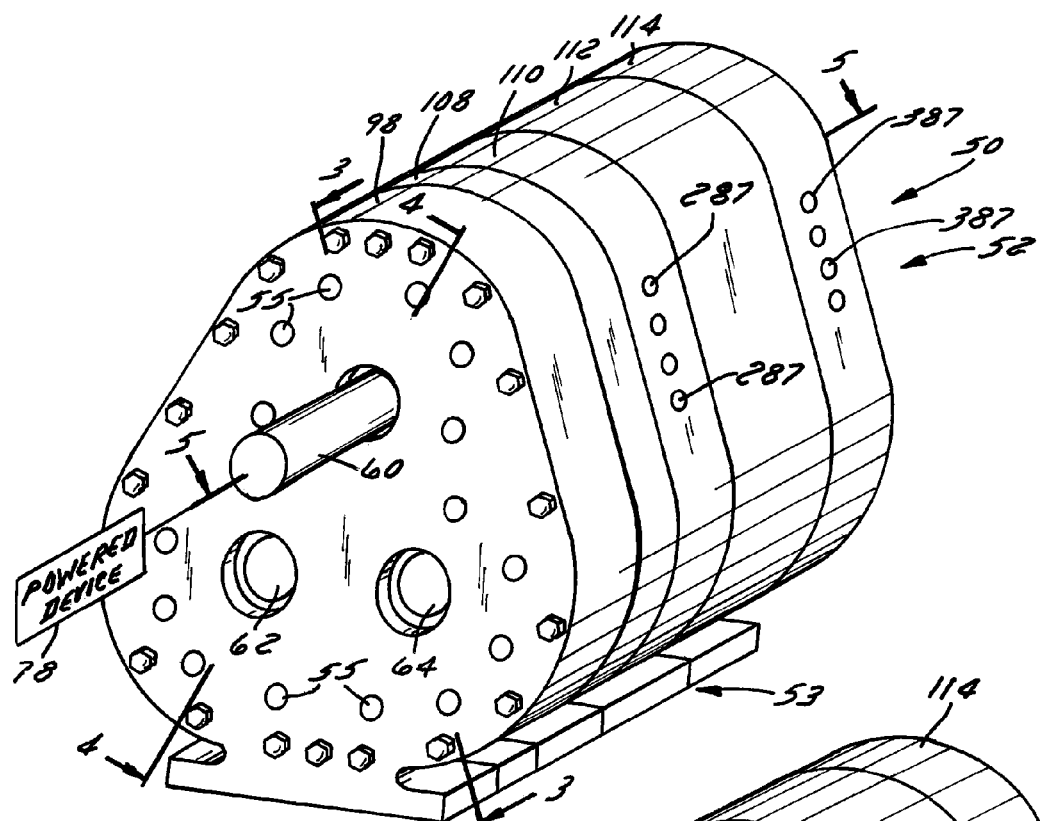
FIG. 1 is an isometric view of a rotary engine constructed in accordance with a preferred embodiment of the present invention.
Figure 1A:
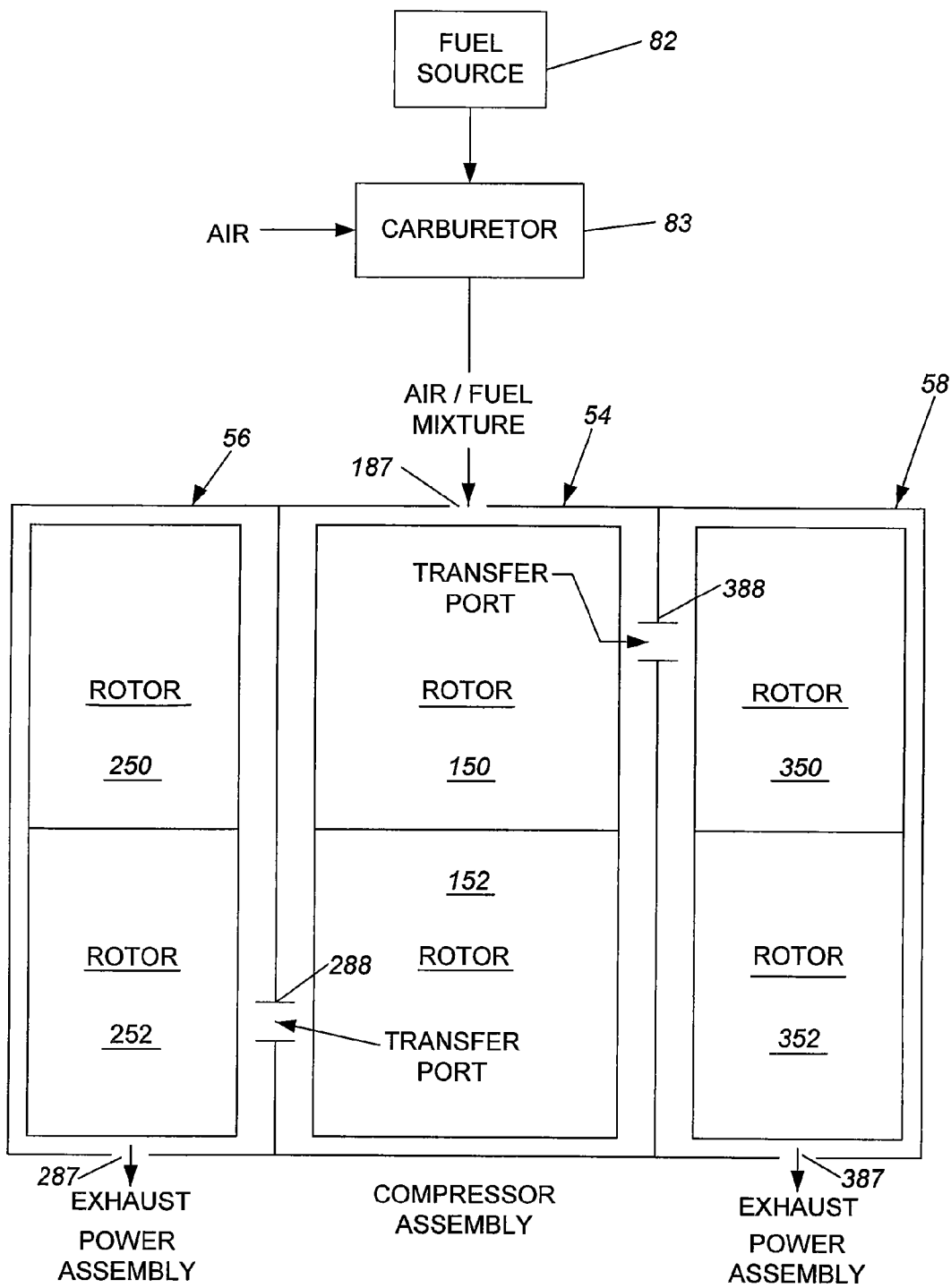
FIG. 1A is schematic view of the rotary engine of FIG. 1.

Referring initially to FIGS. 1-4, and initially to FIGS. 1 and 1A, the engine 50 comprises a housing 52 in which are disposed a compressor assembly 54 and first and second power assemblies 56, 58. As will be discussed in more detail below, each of the assemblies 54, 56, and 58 comprises a pair of intermeshing rotors rotating around spaced axes.

Figure 2:
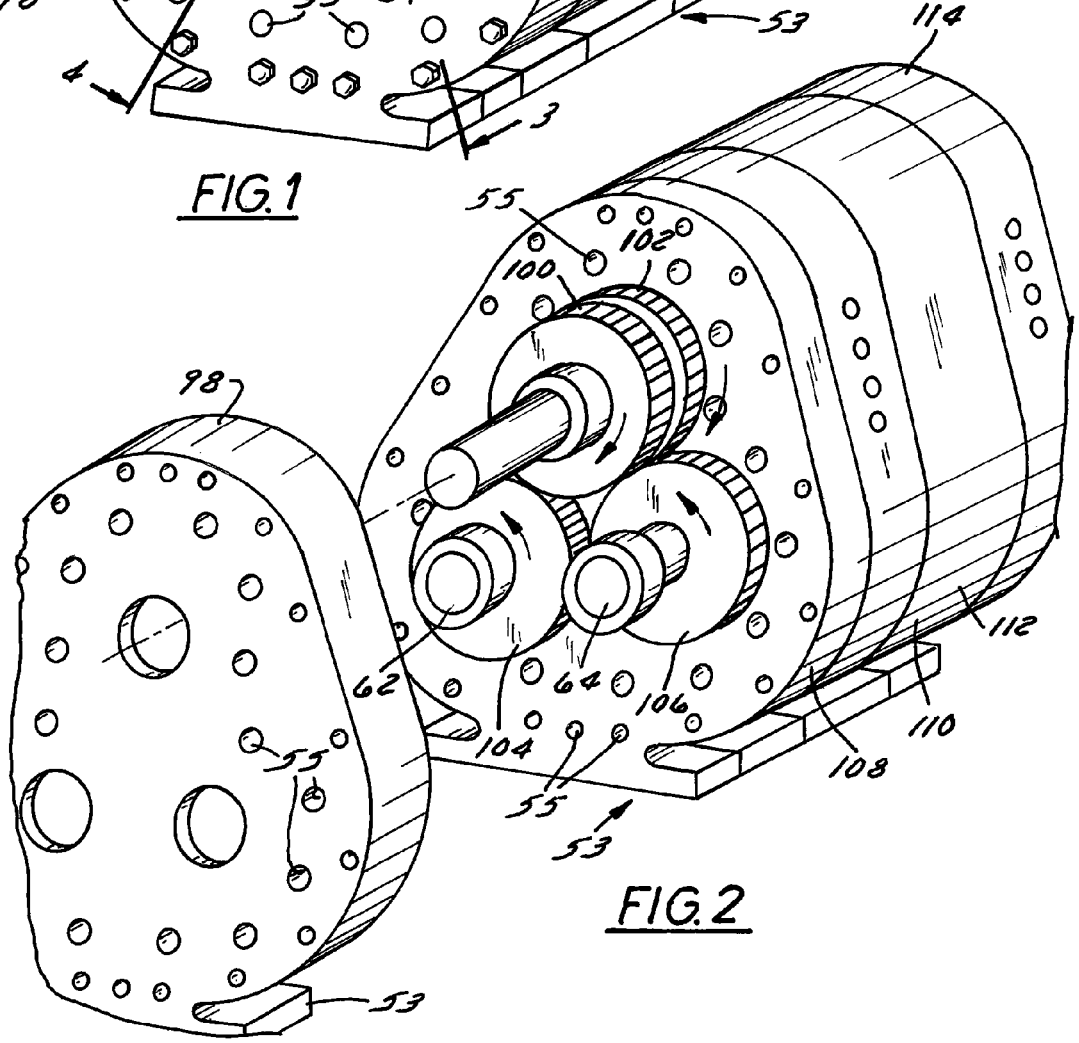
FIG. 2 is a partially exploded isometric view of the engine of FIG. 1, showing a cover of the engine housing removed.

Referring particularly to FIGS. 1 and 2, the illustrated engine has three axes each contained within the center of a respective shaft 60, 62, 64. The compressor assembly 54 is formed from first and second rotors mounted on a main shaft 60 and a first auxiliary shaft 62, respectively. Each of the first and second power assemblies has a first rotor mounted on the main shaft 60 and a second rotor mounted on a second auxiliary shaft 64. All three shafts 60, 62, 64 extend in parallel with one another. A sheave, sprocket, or other takeoff (not shown) can be mounted on a portion of the main shaft 60 that protrudes beyond the outboard end of the housing 52 for transferring torque to a powered device 78. (Terms such as "inboard", "outboard", "top", "bottom", etc. are used solely as a frame of reference, it being understood that the orientation of the engine 50 could vary based on designer preference and the particular application.) The powered device 78 may, for example, be a vehicle drive shaft, a generator drive shaft, or any other device that can be powered by an internal combustion engine or even an electrical motor. The engine is fueled by a combustible fuel such as gasoline provided via a fuel source 82 schematically shown in FIG. 1A and a carburetor 83 schematically illustrated in FIGS. 1A and 6. Spark plugs 84, shown schematically in FIGS. 7 AND 8, are mounted in bores 85 in the power assemblies 56, 58 for igniting fuel in the power assemblies 56, 58.

Figure 6:
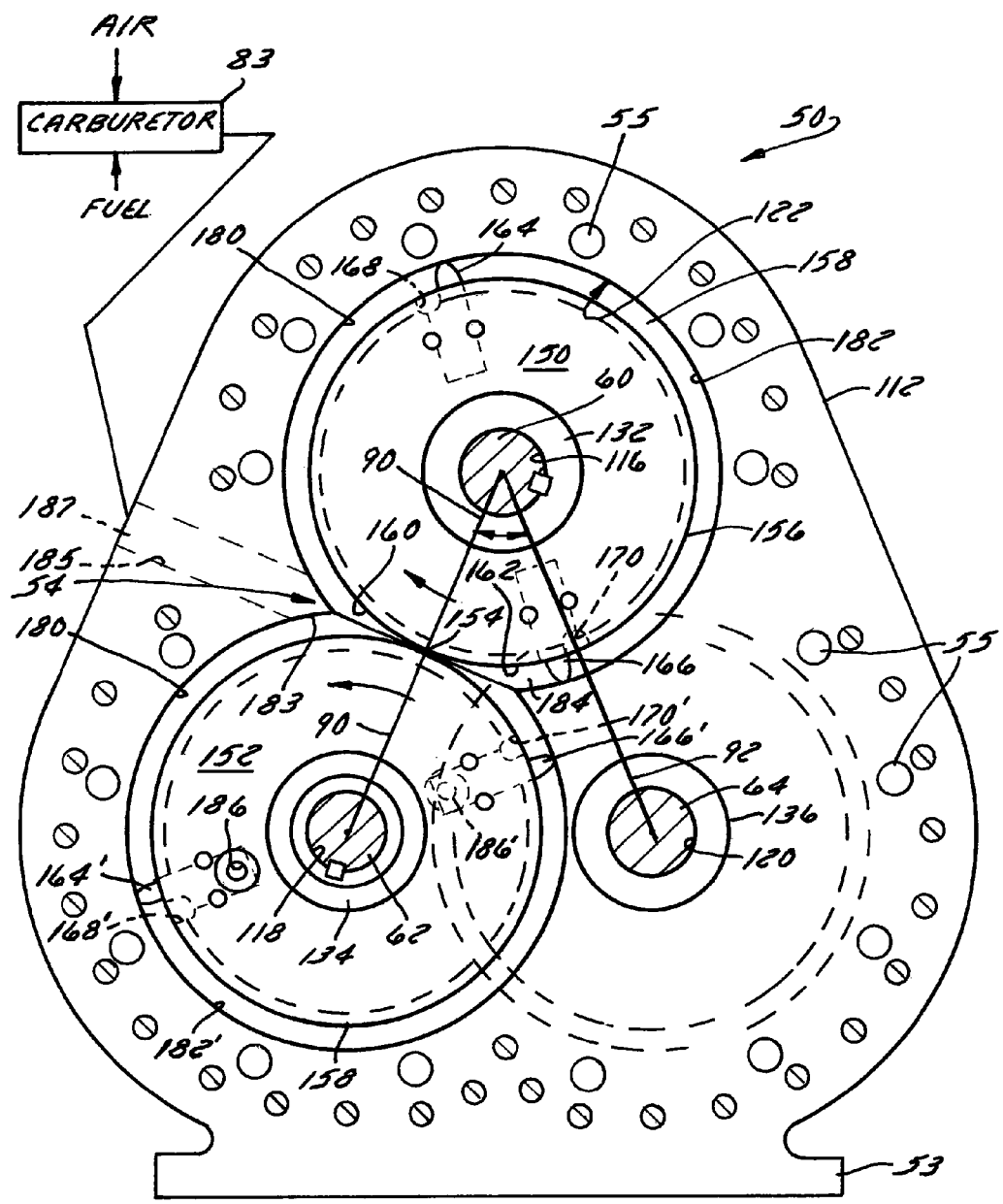
FIG. 6 is a sectional end view taken generally along the lines 6-6 of FIG. 3.
Figure 7:
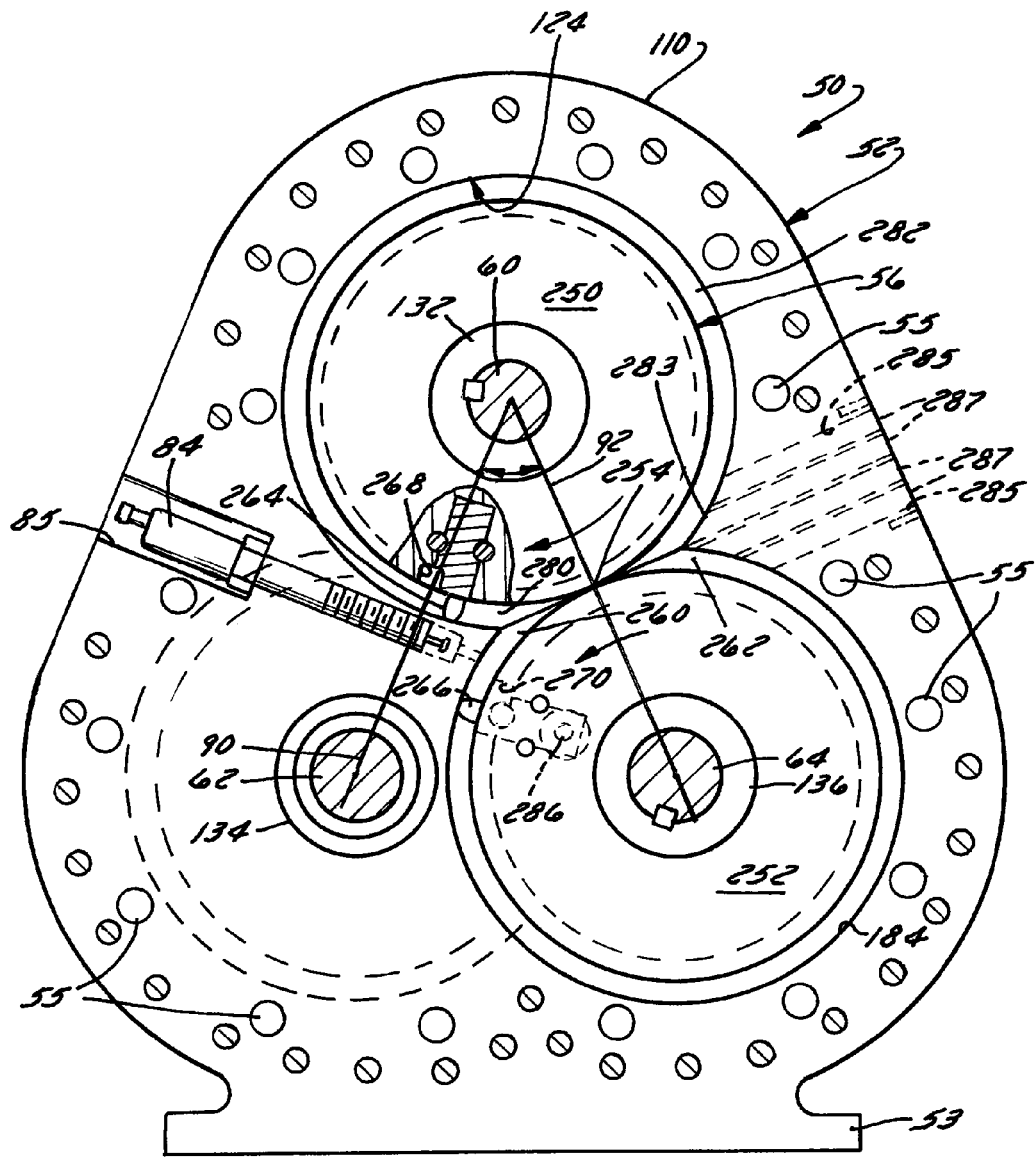
FIG. 7 is a sectional end view taken generally along the lines 7-7 of FIG. 3.
Figure 8:
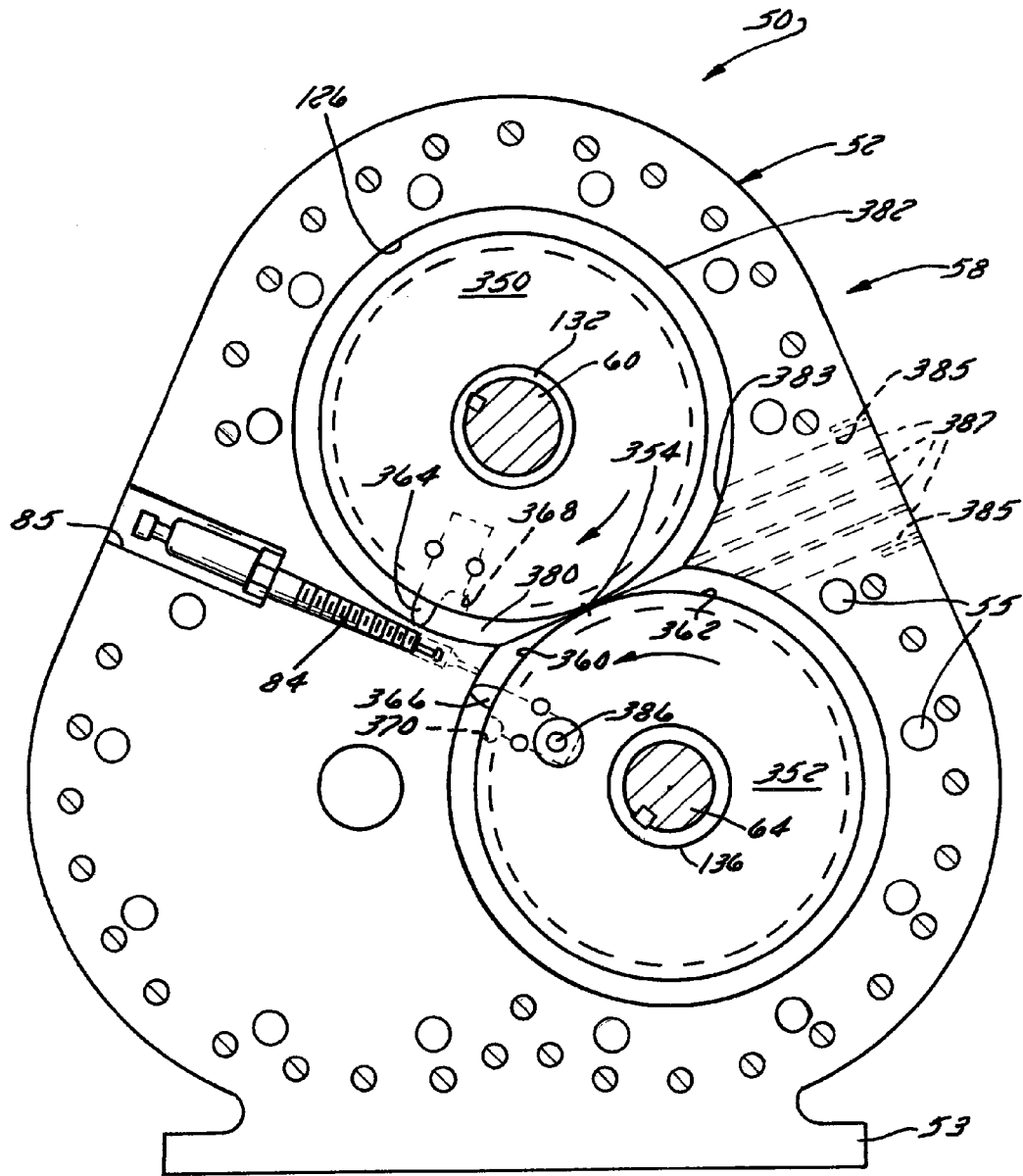
FIG. 8 is a sectional end view taken generally along the lines 8-8 of FIG. 3.
Figure 9:
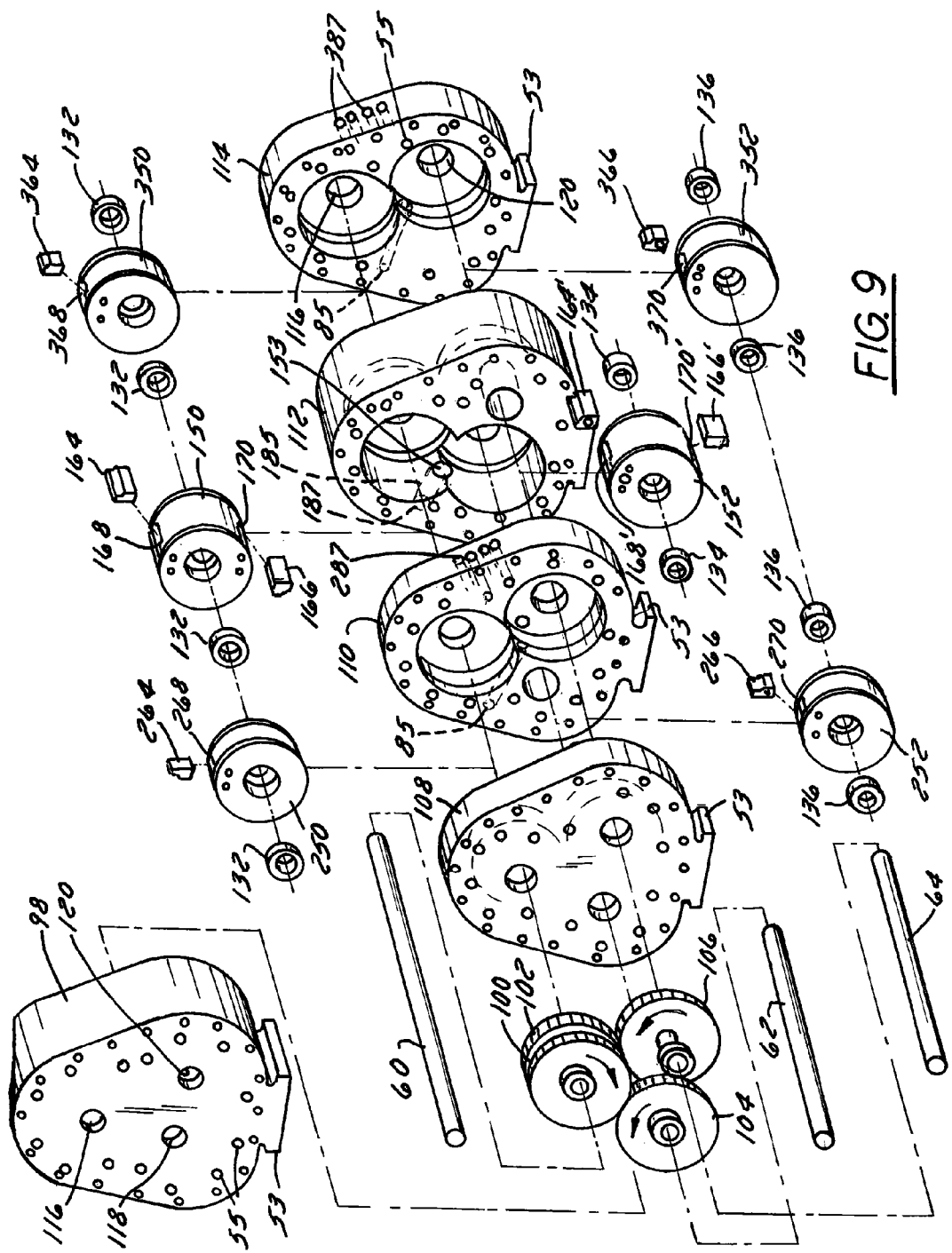
FIG. 9 is an exploded isometric view of a portion of the engine of FIGS. 1-8.

Referring to FIGS. 6 and 7, a line 90 connecting the main shaft 60 and the first auxiliary shaft 62 (and, hence, bisecting the axes of the rotors of the compressor assembly 54) is inclined relative to a line 92 connecting the main shaft 60 and the second auxiliary shaft 64 (and, hence, bisecting the axes of the rotors of either power assembly 56 or 58) by an acute angle of 20° to 70°, more preferably 40° to 50°, and still more preferably, 45°. This inclination permits the compressor assembly to be aligned with the power assemblies in a manner that permits the use of simplified porting for the transfer of a compressed air/fuel mixture from the compressor assembly to the power assemblies while optimizing the timing of the combustion events in the first and second power assemblies 56 and 58 so as to minimize power fluctuations in the engine.

Referring to FIG. 2, the three rotor assemblies 54, 56, 58 are interconnected by a timing arrangement encased in a cover 98 forming an outboard end of the housing 52. The timing arrangement could comprise, for example, a system of gears, chains, belts, pulleys, or a combination of any or all of those devices. The timing arrangement of the illustrated embodiment includes first and second gears 100, 102 that are keyed to the main shaft 60 and that mesh with a third gear 104 on the first auxiliary shaft 62 and a fourth gear 106 on the second auxiliary shaft 64, respectively.

Figure 3:
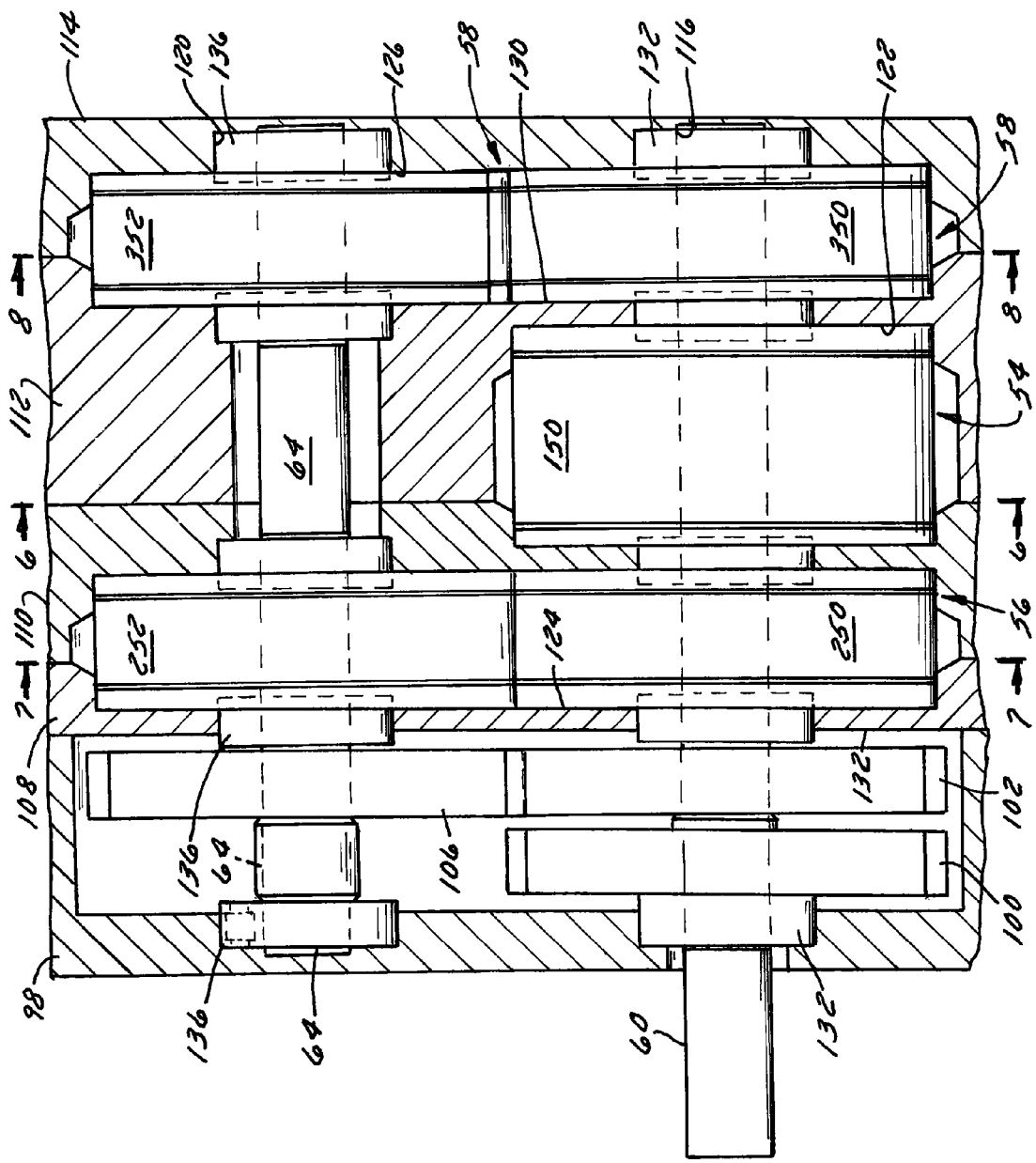
FIG. 3 is a sectional elevation view taken generally along the lines 3-3 of FIG. 1.
Figure 4:
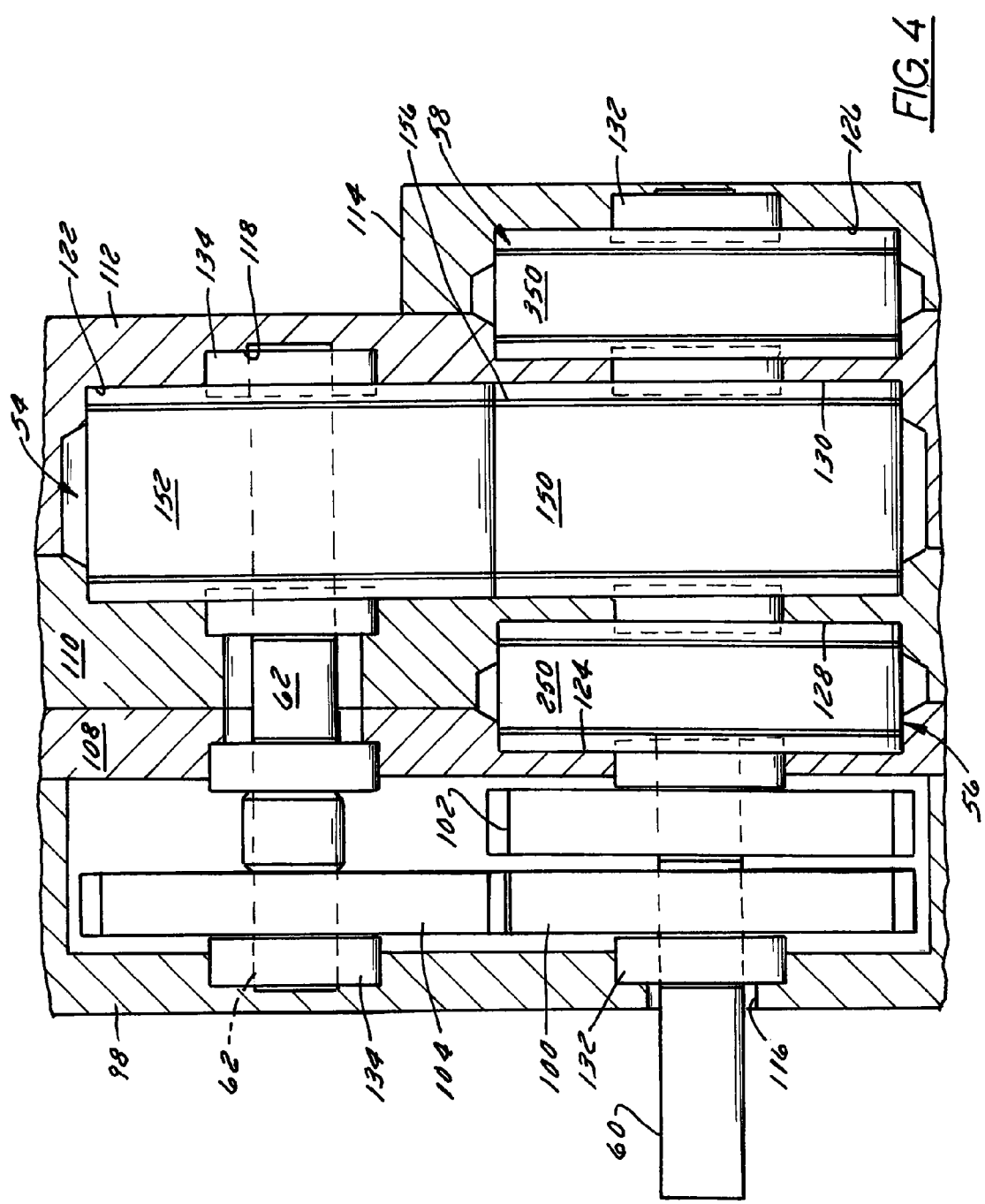
FIG. 4 is a sectional elevation view taken generally along the lines 4-4 of FIG. 1.
Figure 5:
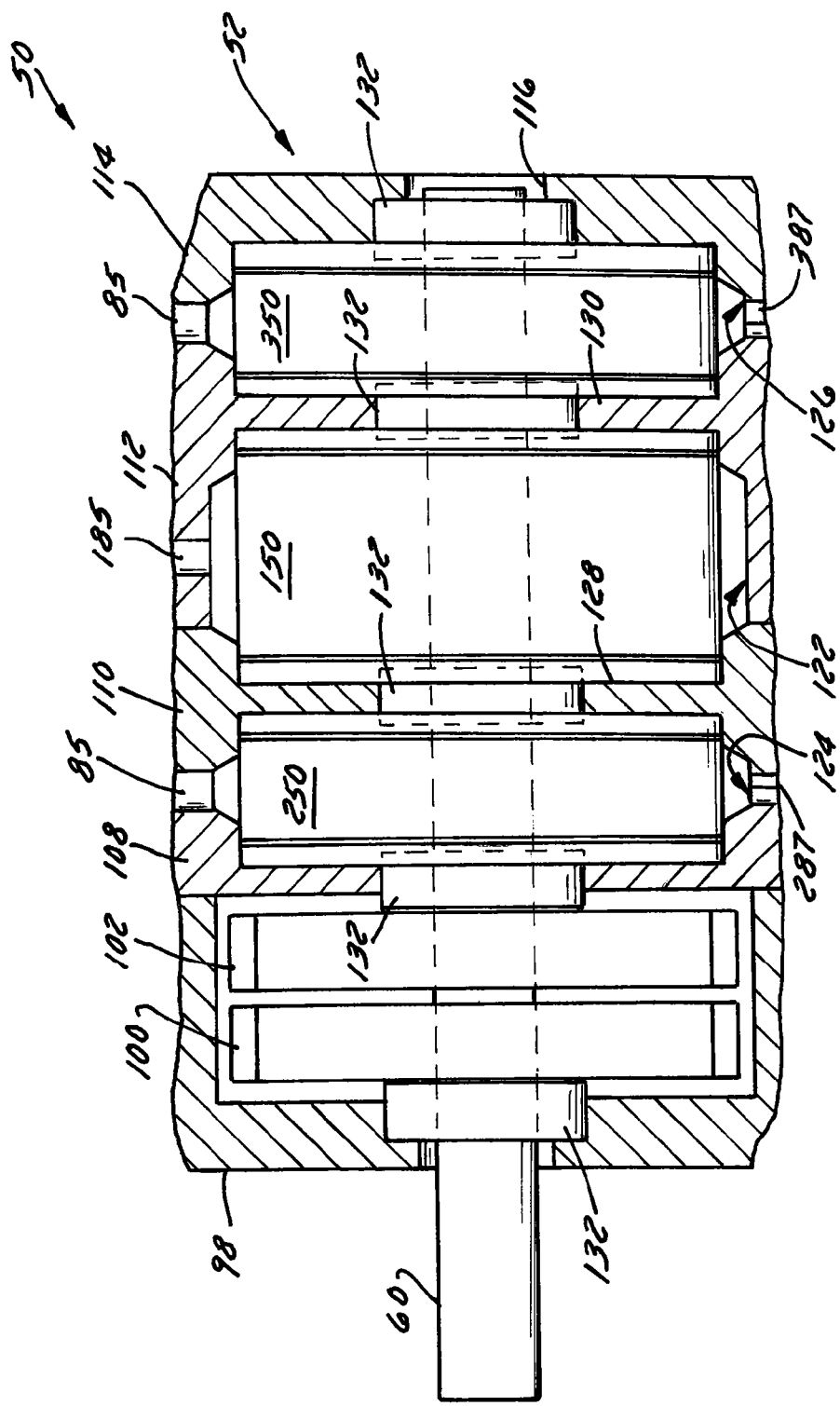
FIG. 5 is a sectional elevation view taken generally along the lines 5-5 of FIG. 1.

Referring briefly to FIGS. 1-5 and 9, the housing 52 of the illustrated embodiment is formed from sections 98, 108, 110, 112, 114 connected together by bolts or any other fasteners. The housing has a base 53 that supports the engine and an integral water jacket formed from a number of bores 55 through which a coolant circulates. As best seen in FIGS. 3-5, each section has aligned bores 116, 118, 120 formed therein for accommodating the shafts 60, 62, 64. The main shaft 60 is borne in the housing 52 by a first set 132 of axially spaced bearings. The first auxiliary shaft 62 is borne in the housing 52 by a second set 134 of spaced bearings, and the second auxiliary shaft 64 is borne in the housing 52 by a third set 136 of spaced bearings. Bores 116, 118, and 120 are counterbored to form three chambers 122, 124, 126 for accommodating assemblies 54, 56, and 58. Each chamber 122, 124, and 126 is shaped as a FIG. 8 when viewed in transverse cross section. Adjacent portions of the housing 52 also form dividing walls separating various chambers in the engine. Most significantly, a first dividing wall 128 separates the chamber 122 housing the compressor assembly 54 from the chamber 124 housing the first power assembly 56, and a second dividing wall 130 separates the chamber 122 housing the compressor assembly 54 from the chamber 126 housing the second power assembly 58. In addition, as seen for example in FIGS. 3, 5, and 7, radial gaps are positioned between peripheries of the chambers 122, 124, and 126 and the various rotors to define compression and expansion chambers and other chambers as detailed below.

The relative diameters and axial thicknesses of the bores, rotors, and chambers can be designed to achieve preferred compression and expansion ratios in the compressor assembly 54 and power assemblies 56 and 58. The compression and expansion ratios can also be set to be dramatically different from one another. This is not possible in a traditional reciprocating piston engine using engine geometry alone. The engine 50 of the preferred embodiment has a 10-1 compression ratio and a 21-1 expansion ratio, which are typically considered to be ideal for spark ignited engines. The geometry of the engine 50 could, if desired, be altered to increase the expansion ratio sufficiently to permit its operation as a compression ignition or diesel engine.

Each of the three rotor assemblies 54, 56, and 58 will now be described in turn.

Referring now to FIGS. 4 and 6, the compressor assembly 54 includes first and second rotors 150, 152 mounted on the main shaft 60 and the first auxiliary shaft 62 as described above. Each rotor 150, 152 has an outer peripheral surface 156 that is identical around its entire circumference except where it is interrupted by a lobe and recess combination. The rotors 150, 152 mesh at a line 154 located at the center of the Figure 8-shaped chamber 122 as seen in FIG. 6. The cylindrical surfaces of the rotors 150 and 152 make a sealing line contact through the vast majority of the rotational cycle of the compressor assembly 54 except when a lobe on one rotor 150 or 152 engages a mating recess in the other rotor 152 or 150. This occurs only through 15-25 degrees of each rotor's rotational cycle. First and second generally v-shaped throats 160, 162 are formed downstream and upstream of this line of contact, respectively. Each throat 160, 162 extends from the line of contact to a point just beyond which the lobe engages the cylindrical bore.

Each rotor 150, 152 of the compressor assembly 54 is shown with two lobes and two recesses forming first and second compression chambers in the compressor assembly 54. This configuration is ideal when the compressor assembly 54 rotates the same speed as the power assemblies 56 and 58, which is necessarily the case when the same shafts support rotors of all three assemblies 54, 56, 58. However, it is conceivable that the compressor assembly 54 and power assemblies 56 and 58 could be supported entirely independently of one another. In this eventuality, the compressor assembly 54 could be geared to rotate at twice the speed of the power assemblies 56 and 58, in which case only a single compression chamber and a single lobe and recess need be employed on each rotor. In this case, a single compression chamber would be pressurized twice for each rotational cycle of the compressor assembly 54 and alternately supply compressed air or an air/fuel mixture to the first and second power assemblies 56 and 58.

In the illustrated embodiment in which the compressor assembly 54 is configured to produce two compression cycles for each cycle of compressor assembly rotation, the rotor 150 has two lobes 164 and 166 and two recesses 168 and 170, and the rotor 152 likewise has two lobes 164', 166' and two recesses 168' and 170'. The lobes and recesses on each rotor 150, 152 are grouped in two sets located diametrically opposite each other on the rotor. Each lobe 164, 164' of one set on a rotor 150, 152 mates with an associated recess 168', 168 on the opposite set on the opposed rotor 152, 150, and each lobe 166, 166' on a rotor 150, 152 mates with an opposed recess 170', 170 on the opposed rotor 152, 150. At any given point in the compressor assembly's rotational cycle, the volumes surrounding the rotors 150, 152 can be conceptually separated into an intake chamber 180, two charge containing chambers 182 and 182', and a compression chamber 184. The intake chamber 180 extends around both rotors 150, 152 from the line of contact 154, through the first throat 160, and to the upstream lobe 164, 164'. (Because the rotors are always rotating, particular components are considered "downstream" or "upstream" only at particular points in the engine's cycle. The description contained herein conforms to the conditions that prevail in the portions of the engine's cycle depicted in the drawings). The intake chamber 180 is connected to one or more intake ports 183 that are connected to air intake passages 185. The intake passages 185 preferably extend through the housing 52 at an acute angle and open into an intake port 187 formed on the exterior surface of the housing and communicating with the outlet of carburetor 83. These passages preferably extend at symmetrical angles from the center of the housing 52 to form an arrangement generally taking the form of a V. Because the intake chamber 180 is always isolated from the other chambers 182 and 184 by the line of contact 154 on its upstream end and the upstream lobes on the downstream ends, traditional intake valves can be replaced by simple one-way check valves or even omitted altogether. Each charge containing chamber 182, 182' extends between the upstream and downstream lobes 164 and 166 or 164' and 166'. The compression chamber 184 extends from the downstream lobe 166 and 166', through the second throat 162, and to the line of contact 154. A compressed air outlet 186, 186', formed in an axial end surface of the rotor 152, opens only at designated portions of the engine's operation cycle as described in more detail below.

During operation of the engine 50, each charge containing chamber 182, 182' contains a full charge of an unpressurized air/gas mixture trapped between the lobes 164 and 166 or 164' and 166', and the intake chamber 180 is being charged with an air/fuel mixture drawn into the engine through the intake passages 185. The intake chamber 180 increases in volume through a portion of each rotor's rotational cycle that begins when the upstream lobe 164, 164' traverses the line of contact 154 and ends when the downstream lobe 166, 166' traverses the line of contact 154. The compression chamber 184 decreases in volume through a portion of each rotor's rotational cycle that begins with when the downstream lobe 164, 164' exits the throat 160 and ends when the upstream lobe 166, 166' exits the throat 160. The air/fuel mixture in the chamber 184 is compressed during this volume decrease until the outlet 186 or 186' opens and compressed mixture flows into the combustion chamber of the associated power assembly 56 or 58. The outlet 186, 186' closes just before the lobe 164' or 166' passes the line of contact 154, whereupon the volumes formerly serving as the charge containing spaces 182 and 182' open into each other and effectively became a second compression chamber the volume of which is decreased by continued rotation of the rotor assembly.

Figure 10:
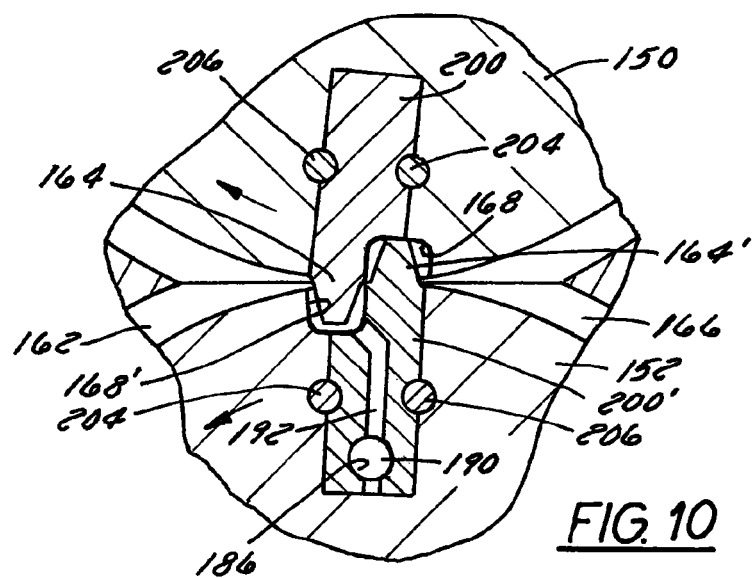
FIG. 10 is a detail view showing the meshing lobes of two rotors of the engine of FIGS. 1-9.

The manner in which each lobe meshes with the associated recess and in which compressed air flows out of the compression chamber 184 can be appreciated by referring to FIG. 10, which shows the interaction of two lobes 164, 164' with their associated recesses 168', 168. Specifically, it can be seen that the recess 168' is considerably wider than the lobe 164 and at least as deep as the depth of the lobe 164 so as to permit the lobe 164 to rotate into and out of the recess 168' without interfering with rotor rotation. This size differential also permits unobstructed flow of compressed air into the portion of the recess 168' that surrounds the lobe 164. The insert or portion 200' of the lobe 164' that is retained in the rotor 152 has an axial outlet passage 190 formed therein terminating in the axial outlet port 186 of the compressor assembly 54.

Compressed air is supplied to passage 190 by a number of axially spaced, generally radially extending inlet passages 192 formed in the insert 200'.

Figure 11:
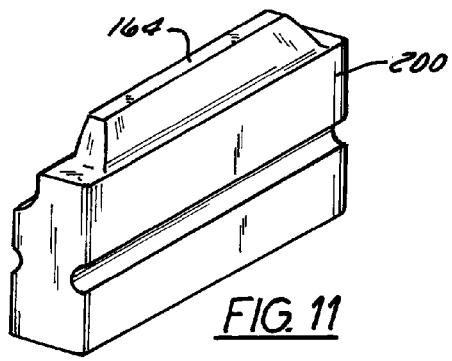
FIGS. 11-15 are various detail views of the lobes of the compression assembly of the engine of FIGS. 1-9.
Figure 13:
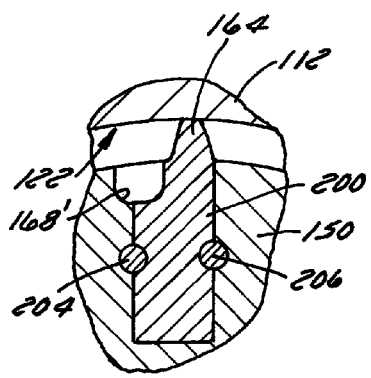
Figure 12:
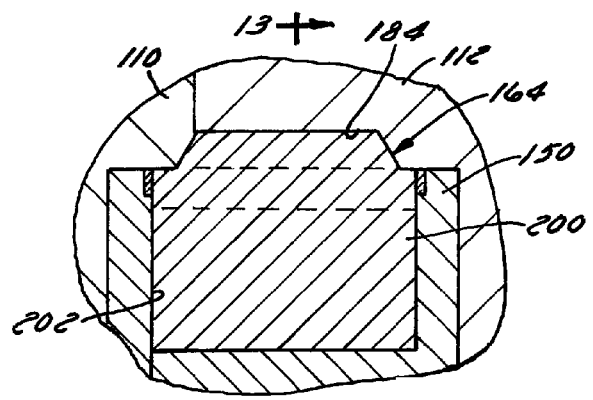

Further details of the lobes and their surrounding structures are illustrated in FIGS. 11-15. The lobes 164 and 166 are identical to one another. A representative lobe 164 is illustrated in FIGS. 11-13, it being understood that the description applies equally to lobe 166. Lobe 164 is formed on the outer surface of a machined metal insert 200 retained in a radial bore 202 in the rotor 150. Insert 200 is retained in the bore 202 by first and second retaining pins 204 and 206, each of which is inserted axially into mating peripheral semi-cylindrical recesses in the lobe 164 and the recess, respectively. The lobe 164 is sized and shaped to match the size and shape of the cross-section of the compression chamber 184. In the illustrated embodiment, the compression chamber is generally trapezoidal in cross section. The lobe 164 therefore is likewise trapezoidal so as to effectively block the compression chamber. The insert 200 for lobe 164 has an imperforate interior as seen in FIGS. 11-13.

Figure 14:
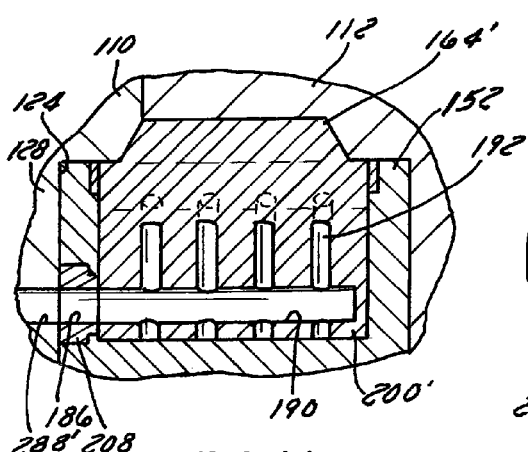
Figure 15:
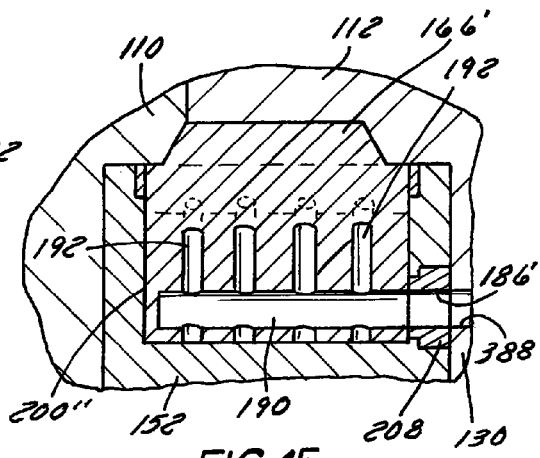

Referring now to FIGS. 14 and 15, the lobes 164' and 166' in the rotor 152 include the above-mentioned compressed air outlet port 186, 186' and the associated passages leading to it. As can be seen in FIGS. 14 and 15, the interiors of lobes 164' and 166' are mirror images of each other, with each containing the plurality of radial inlet passages 192 and a single axial outlet passage 190 opening to the outlet 186, 186'. The axial gap between the outlet port 186 or 186' and the dividing wall 128 or 130 is bridged by a tubular seal 208 that rides against the dividing wall 128 and 130 and that opens into the cross passage or transfer port 288 or 388 (FIG. 1A) in the dividing wall 128 or 130 passage when the outlet port 186 or 186' is aligned with the passage 288 or 388. That seal may be spring loaded to enhance its effectiveness.

The power assemblies 56 and 58 are functionally identical to one another but operate 180° out of phase with respect to each other. Structurally, they comprise mirror images of one another with each having an axial inlet port that faces toward the associated divider wall 128, 130 of the housing section containing the compressor assembly 54.

FIGS. 3 and 7 show the first power assembly 56. It includes first and second counter-rotating rotors 250, 252 mounted on the main shaft 60 and the second auxiliary shaft 64 as described above. The rotors 250, 252 mesh at a line 254 located at the center of chamber 124. Each rotor 250, 252 has an outer peripheral surface that is identical around its entire circumference except where it is interrupted by a lobe and recess combination. The cylindrical surfaces of the rotors make a sealing line contact through the vast majority of the rotational cycle of the first power assembly 56 except when the lobes on the rotors engage the mating recesses in the other rotor. As with the compressor assembly 54, this meshing occurs only through 15-25 degrees of each rotor's rotational cycle. For purposes of discussion, the rotational position of the power assembly 56 in which the lobes mesh with the detents at the line of contact 254 will be considered the "top dead center" or TDC position of the first power assembly.

Still referring to FIG. 7, first and second generally v-shaped throats 260 and 262 are formed upstream and downstream of the line of contact 254, respectively. The volume surrounding the rotors 250 and 252 can be conceptually divided into an expansion chamber 280 and an exhaust chamber 282. The expansion chamber 280 extends from the line of contact 254, through the first throat 260, and to the upstream surfaces of the lobes 264 and 266 on the rotors 250 and 252. It is connected to an inlet port 286 opening axially into the expansion chamber 280. That inlet port 286 aligns with the cross passage 288 in the dividing wall 128 once during each rotational cycle of the rotor 252. The spark plug 84 also opens into the expansion chamber 280 in the vicinity of the throat 260.

The exhaust chamber 282 extends from the downstream surfaces of the lobe 264, 266, through the second throat 262, and to the line of contact 254. One or more exhaust ports 283 are formed in the second throat 262 and are connected to exhaust passages 285 extending through the housing 52 at an acute angle, where they terminate in exhaust ports 287. Because the exhaust chamber 282 is always isolated from the expansion chamber 280 by the lobes 264, 266 on its upstream end and the line of contact 254 on its downstream end, traditional exhaust valves can be replaced by simple one-way check valves or even omitted altogether.

During operation of the engine, the inlet port 286 in the rotor 252 aligns with the outlet of the cross passage 288 in dividing wall 128 just after the lobe 266 passes the line of contact 254, permitting the compressed air/fuel mixture to flow into the expansion chamber 280 from the cross passage 288 and the chamber 184 in the compressor assembly 54 as best seen in FIGS. 1A, 14 and 20. This alignment preferably occurs at about 20°-30°, and more preferably about 25°, after the TDC position of the power assembly 56. It should be apparent at this time that the porting arrangement formed by the outlet port 186 in the first lobe 164' on the compressor rotor 152, the inlet port 286 in the lobe 266 on the rotor 252, and the cross passage 288 in the dividing wall 128 provides a valve-less mechanism for supplying the compressed air/fuel mixture to the expansion chamber 280 at a precisely controlled point in the operational cycle of the first power assembly 56. This arrangement considerably simplifies engine design and operation.

The spark plug 84 is then energized to trigger a combustion event. The expansion resulting from this combustion drives the lobes 264, 266 and rotors 250, 252 to rotate in opposite direction, increasing the size of the expansion chamber 280. Rotation of the rotors 250, 252 simultaneously decreases the size of the exhaust chamber 282 to force exhaust gases out of the exhaust ports 287. The power generated by this rotation is transmitted to the compressor assembly 54 through the shafts 60 and 64 and gears 100, 104 and 102, 106 to compress the air/fuel mixture in the next portion of the engine's operational cycle.

Further details of the lobes 264 and 266 and their surrounding structures are illustrated in FIGS. 16-21. Each of these the lobes 264, 266 protrudes from a machined metal insert 300, 300' retained in a radial bore 302, 302' in the rotor 250, 252 by first and second retaining pins 304, 306 (FIGS. 17 and 21), each of which is inserted axially into mating peripheral recesses in the lobe and the recess, respectively. Each lobe 264, 266 is sized and shaped to match the size and shape of the cross-section of the expansion chamber 280. In the illustrated embodiment, the expansion chamber 280 and lobes 264, 266 are generally trapezoidal in cross section.

The insert 300 of the lobe 264 in the rotor 250 lacks an inlet and, therefore, has an imperforate insert interior as seen in FIGS. 16-18. Referring now to FIGS. 19-21, the insert 300' of the lobe 266 in the rotor 252 includes the above-mentioned inlet port 286 and passages directing the air/fuel mixture from that port to the expansion chamber 280. These passages include a plurality of radial inlet bores 292 opening into the adjacent recess 270 and a single axial inlet passage 290 opening into port 286. Port 286 aligns with the cross-passage 288 in the associated dividing wall 128 once during each rotational cycle of the power of assembly 56 as seen in FIG. 20. The axial gap between the inlet port 286 and the divider wall 128 is bridged by a tubular seal 308 that rides against the divider wall 128 and that opens into the outlet of the passage 288 when the inlet port 286 is aligned with the passage 288. That seal may be spring loaded to enhance its effectiveness.

Referring now to FIGS. 3, 5, 6, and 8 and particularly to FIG. 8, the second power assembly 58 includes first and second rotors 350, 352 mounted on the main shaft 60 and the second auxiliary shaft 64. The rotors 350 and 352 mesh at a line 354 formed in the narrowest point of the Figure 8-shaped chamber 126. Each rotor 350, 352 has an outer peripheral surface that is cylindrical around its entire circumference except where it is interrupted by a lobe and recess combination. The cylindrical surfaces of the rotors make a sealing line contact at line 364 through the vast majority of the rotational cycle of the second power assembly 58 except when a lobe 364 or 366 on one rotor 350, 352 engages a mating recess 370 or 368 in the other rotor 352, 350. As with the compressor assembly 54 and the first power assembly 56, this occurs only through 15-25° of each rotor's rotational cycle. First and second generally v-shaped throats 360 and 362 are formed upstream and downstream of this line of contact 354, respectively. Each throat 360, 362 extends from the line of contact to the point of which the lobe engages the cylindrical base. An expansion chamber 380 extends from end of the first throat 360 and to the upstream surfaces of the lobes 364 and 366. Chamber 380 is connected to an inlet port 386 opening axially into the lobe 366 in rotor 352 as discussed below. The spark plug 84 also opens into the expansion chamber 380 in the vicinity of the first throat 360. An exhaust chamber 382 extends from the downstream surfaces of the lobes 364, 366, through the second throat 362, and to the line of contact 354. Several exhaust ports 383 are formed in the second throat 362 and are connected to exhaust passages 385. The exhaust passages 385 extend through the housing 52 at an acute angle and open into exhaust ports 387 formed on the exterior surface of the housing 52. The exhaust chamber 382 is always isolated from the expansion chamber 380 by the lobes 364 and 366 on its upstream ends and the line of contact 354 on the downstream ends. Traditionally, exhaust valves therefore can be replaced by simple one-way check valves or even omitted altogether.

During operation of the engine 50, the inlet port 386 in the rotor 352 aligns with the outlet of the supply passage 388 in divider wall 130 just after the lobe 366 exits the first throat 360, permitting the compressed air/fuel mixture to flow into the expansion chamber 380. This alignment preferably occurs at about 20°-30°, and more preferably about 25°, after the TDC position of the second power assembly 58.

It should be apparent at this time that the porting arrangement formed by the outlet port 386 in the second lobe 366 on the rotor 352, the outlet port 186' in the lobe 166' on the compressor rotor 152, and the interposed cross passage 388 in the divider-wall 130 provides a valve-less mechanism for supplying the compressed air/fuel mixture to the expansion chamber 380 at a precisely controlled point in the operational cycle of the second power assembly 58.

The spark plug 84 thereafter is energized to trigger a combustion event. The expansion resulting from this combustion drives the lobes 364 and 366 and rotors 350 and 352 to rotate in opposite direction, increasing the size of the expansion chamber 380 and decreasing the size of the exhaust chamber 382 to force exhaust gases out of the exhaust ports. The power generated by this rotation is transmitted to the compressor assembly 54 through the shafts 60 and 64 and gears 102, 106 and 100, 104 to compress the air/fuel mixture in the next portion of the engine's operational cycle. It bears repeating at this time that, due to geometry of the engine 50 including the inclination of the compressor assembly 54 relative to the power assemblies 56 and 58 and the locations of the ports, the power assemblies 56 and 58 operate 180° with one another so that the first power assembly 56 is at bottom dead center (BDC) when the second power assembly 58 is at TDC.

Further details of the lobes 364 and 366 and their surrounding structures are illustrated in FIGS. 21-27. Each of the lobes 364 and 366 is formed on the outer surface of a machined metal insert 400, 400'. Each insert 400 or 400' is retained in a radial bore 402, 402' in the rotor 350 or 352 by first and second retaining pins 404, 406, each of which is inserted axially into mating peripheral recesses in the lobe and the recess, respectively. Each lobe 364, 366 is sized and shaped to match the size and shape of the cross-section of the expansion chamber 380. In the illustrated embodiment, the expansion chamber 380 is generally trapezoidal in cross section. Each lobe 364, 366 therefore is likewise trapezoidal so as to effectively block the compression chamber.

Figure 23:
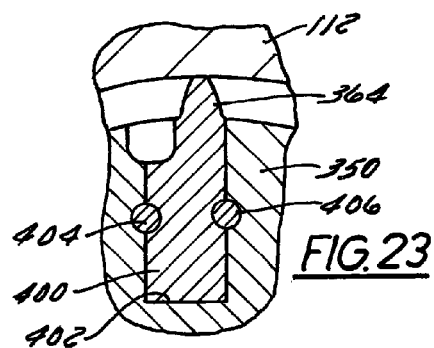
FIGS. 22-27 are various detail views of the lobes of the other power assembly of the engine of FIGS. 1-9.
Figure 22:
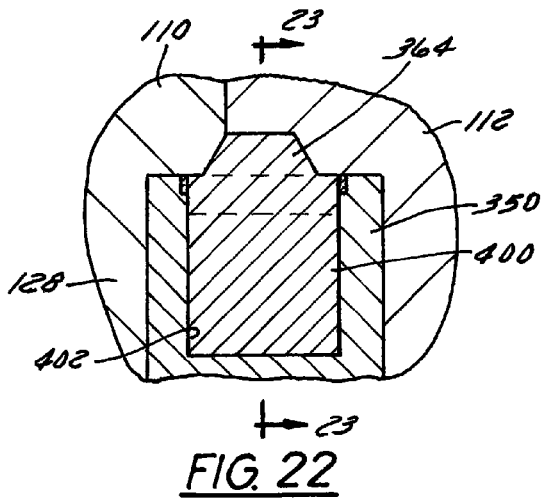
Figure 24:
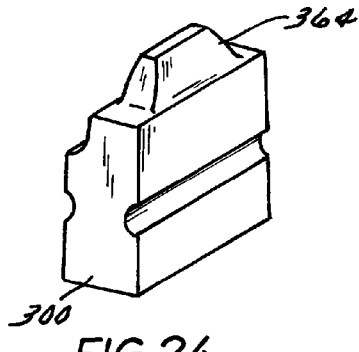
Figure 25:
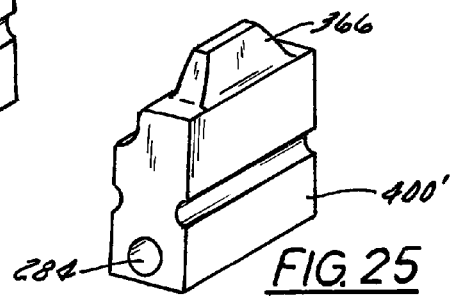
Figure 27:
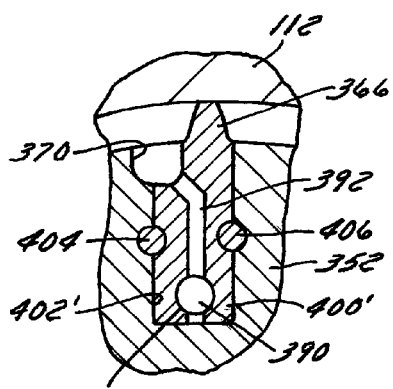
Figure 26:
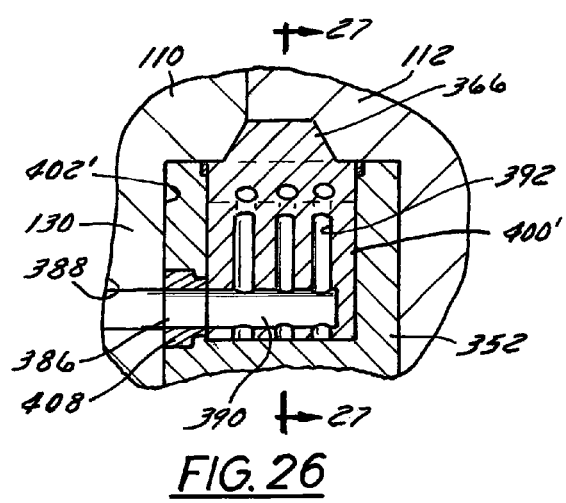

The insert 400 of the lobe 364 in the rotor 350 lacks an inlet and, therefore, has an imperforate interior as seen in FIGS. 22-24. Referring now to FIGS. 25-27, the insert 400' of the lobe 366 on the rotor 352 includes the above-mentioned inlet port 386 and passages leading to it. These passages include a plurality of radial outlet bores 392 opening into the adjacent recess 370 and a single axial inlet passage 390 that receives the compressed air/fuel mixture from port 386. The axial gap between the rotor 352 and the divider wall 130 is bridged by a spring loaded tubular seal 408 that rides against the divider wall 130 and that opens into the outlet of the passage 388 when the inlet port 386 is aligned with the passage 388.

An alternative lobe 2164 is illustrated in FIGS. 29-31. This style lobe could be used to replace any or all of the lobes described above. Hence, while this embodiment will be descried as a possible replacement for the lobe 164 of FIGS. 11-13, the concepts are equally applicable to the remaining lobes discussed above.

The lobe 2164 of this embodiment is of a two-piece construction. It includes a housing or holder 2200 having a thin metallic sealing blade 1164 inserted into a slot 2204 extending longitudinally of the holder 2200. Holder 2200 is retained in the bore 202 by first and second retaining pins 2206 and 2207. The sealing blade 1164 slides radially out of the slot 2204 under centrifugal forces to engage the wall 112 as seen in FIG. 30. One or more biasing springs (not shown), may be inserted into the base of the slot 2204 to bias the blade 1164 toward its sealing position. The blade 1164 is retained in the holder 2200 by pins 2208 that extend through elongated slots 1166 in the blade 1164 and mating holes 2210 in the holder 2200. Movement of the blade 1164 radially into and out of the holder 2200 is limited by engagement of the pins 2208 against the upper and lower edges of the slots 1166.

Figure 28A:
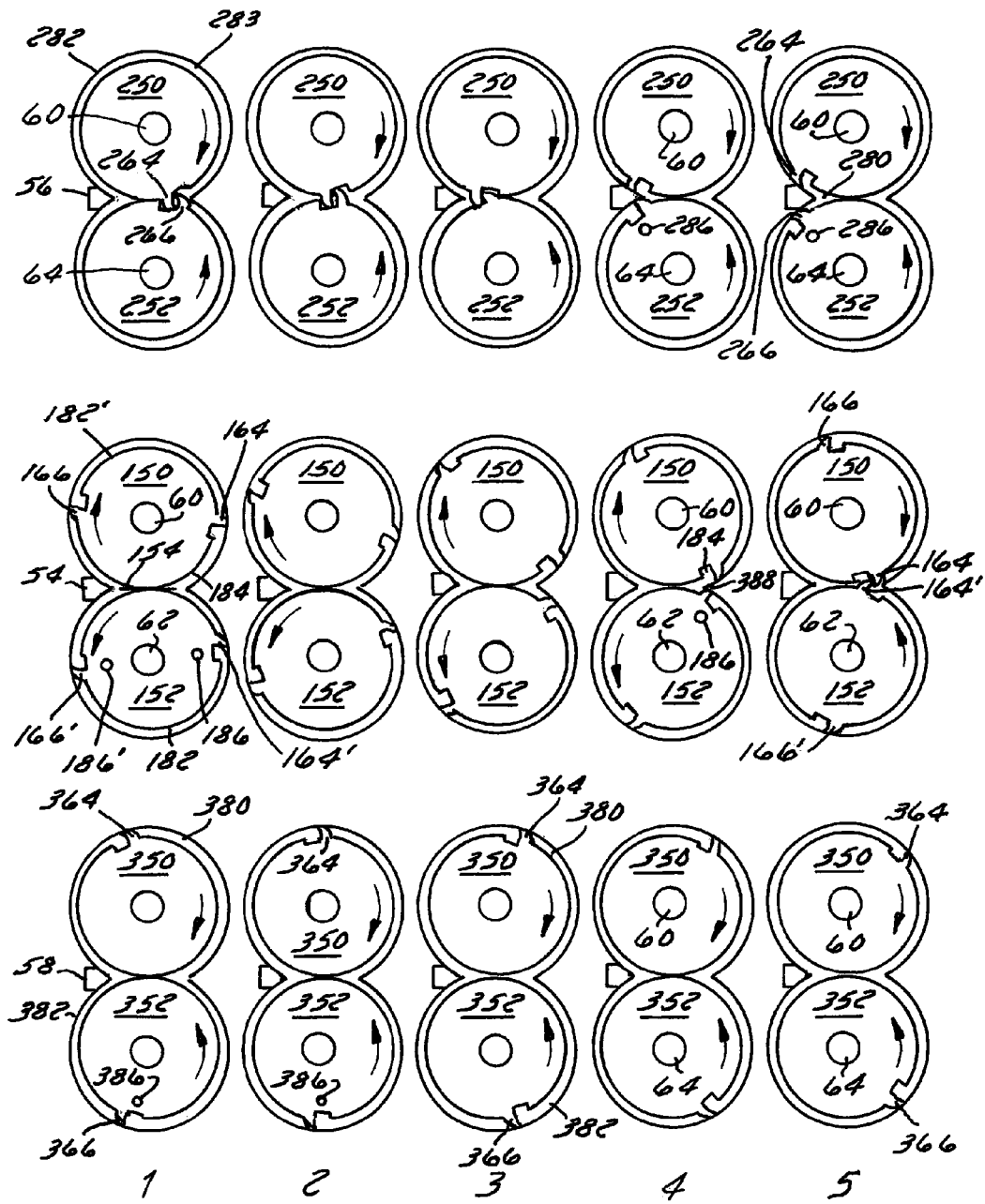
FIGS. 28A and 28B schematically illustrate the engine of FIGS. 1-9 in various phases of its operational cycle.
Figure 28B:
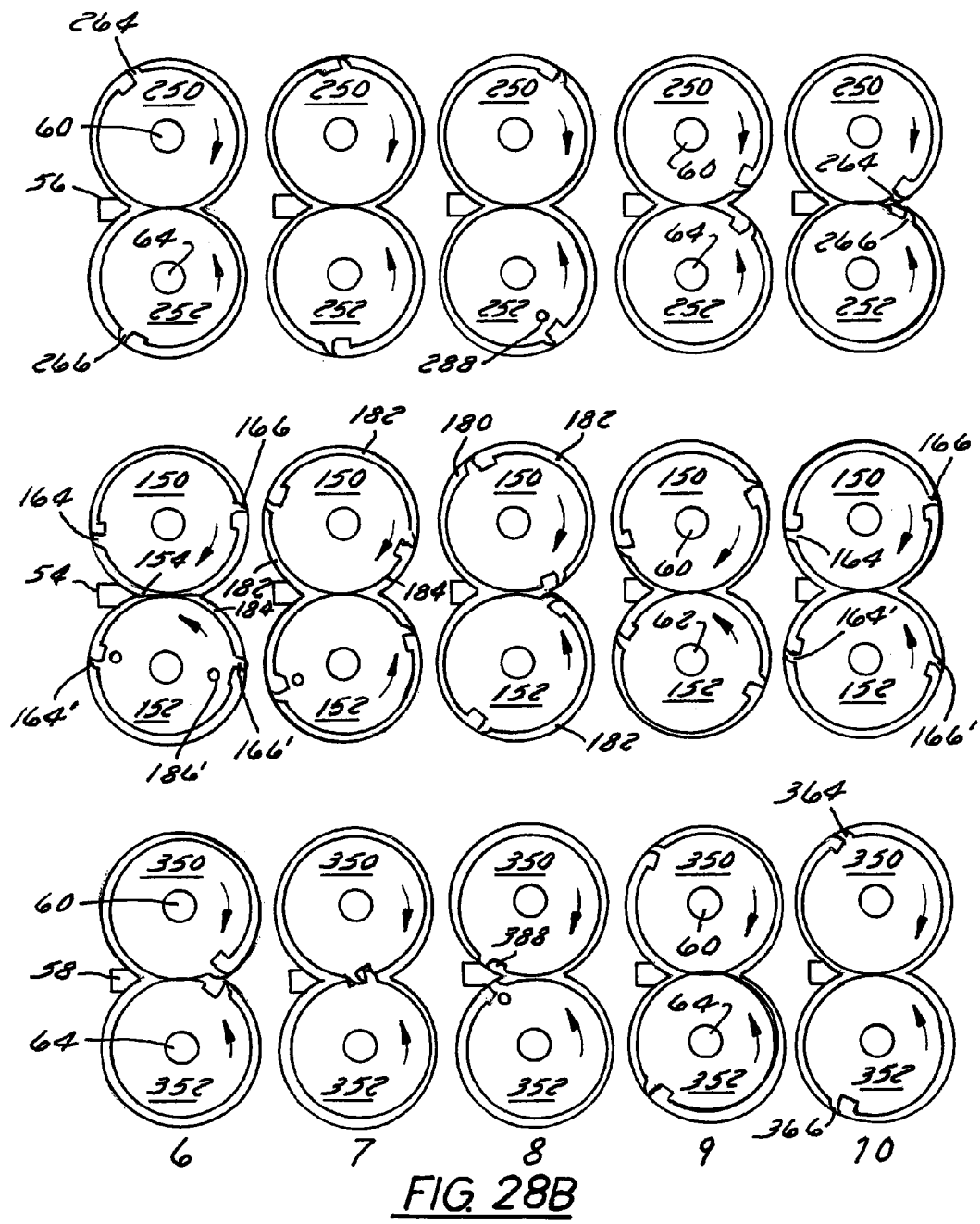

The operation of the engine 50 will now be described with reference to FIGS. 28A and 28B, which schematically show the positions of the rotors of each of the assemblies 54, 56 and 58 at 10 different phases of a full cycle of the engine's operation in which each assembly rotates through a full 360° cycle. Reference is also made to the remaining drawings for structural details not shown in FIGS. 28A and 28B. At stage 1, the compression chambers of the compressor assembly 54 are isolated from both power assemblies 56 and 58, and the second power assembly 58 is nearing the BDC position of its operational cycle. The ongoing power stroke in the second power assembly 58, extending through about 320° of the second power assembly's rotational cycle, drives the first power assembly 56 and compressor assembly 54 to rotate via operation of the intermeshing gears 100, 102, 104, 106 and the shafts. The resultant rotation of the compressor assembly 54 compresses air and fuel in the first compression chamber 184 as the relevant lobes 164 and 164' approach the line of contact 154 formed by the mating rotors 150, 152.

The lobes of assembly 56 enters and pass through the corresponding recesses during stages 2 and 3 as the power assemblies 56 and 58 rotate through their TDC and BDC positions, respectively.

At stage 4, the volume of the compression chamber 184 is near a minimum, with maximum compression. At that time, the outlet port 186 in the lobe 164' of the compressor assembly 54 aligns with the inlet port 286 in the first power assembly 56 via mutual alignment with opposed ends of the intervening cross passage 288 in divider wall 128, allowing the compressed air/fuel mixture to flow into the expansion chamber 280 from the first compression chamber 184. A spark is then applied to the expansion chamber 280, resulting in ignition. As seen in stages 6 through 8, this ignition and resultant power stroke drive the first power assembly 56 to rotate, which also drive the compressor and second power assemblies 54 and 58 to rotate. The rotation of the compressor assembly 54 compresses the air/fuel mixture in the second compression chamber 184 until the outlet port 186' in the second compressor lobe 166' and the inlet port 388 in the expansion chamber 280 in the second power assembly 58 align with the cross passage 388 in the divider wall 130, allowing compressed air and fuel to flow into the expansion chamber 380 of the second power assembly 58. Fuel and a spark are then added to chamber 380, resulting in ignition and an expansion or power stroke beginning in stage 8, and the process proceeds anew.

Power output remains uniform throughout the operational cycle of the engine 50 by employing two sets of power assemblies that are 180° out of phase. That is, as seen at stage 1, the power output for the second power assembly 58 is substantially maximum when the power output for the first power assembly 56 is substantially minimal. The converse is true at stage 7. At each stage, the total power output of the engine is substantially uniform, hence negating the need for a governor. The first power assembly 56 provides the power for compressing the air/fuel mixture for second power assembly 58 and vice versa. The loading on the main shaft 60 is also relatively uniform, resulting in less wear and increasing the life of the bearings and other components. In addition, all four cycles of operation of a traditional four stroke engine (intake, compression, expansion, and exhaust) occur simultaneously in the various chambers rather than sequentially in the same chamber. That is, each rotor assembly simultaneously performs two functions. Intake and compression occur simultaneously in different portions of the compressor assembly, and expansion and exhaust occur simultaneously in different portions of each of the power assemblies.

Many changes and modifications may be made to the embodiments of the invention discussed above without departing from the spirit and scope of the present invention. For instance, in addition to possible modifications discussed above, the engine could be fuel injected rather than carbureted. In this case, the carburetor would be eliminated and fuel would be injected into or upstream of the expansion chamber of the power assemblies by fuel injectors before or just after the compressed charge is admitted into the power assemblies, and air rather than an air/fuel mixture would be admitted into the compressor assembly and compressed.

It should be noted that various alternatives will be possible and all such modifications will fall within the scope of the appended claims.

We claim:

1. An internal combustion engine comprising:
   a compressor assembly including first and second intermeshing compressor rotors, each of which is rotatable about a respective axis, a compression chamber being formed partially around the compressor rotors and decreasing in size during a portion of each rotational cycle of the compressor assembly to pressurize air in the compression chamber; and
   a power assembly including first and second intermeshing combustor rotors, each of which is rotatable about a respective axis, an expansion chamber being formed partially around the combustor rotors and increasing in size during a portion of each rotational cycle of the power assembly rotor assembly under the power of a combustion event; and
   a fuel source that at least indirectly supplies fuel to the expansion chamber,
   wherein
   the expansion chamber is connected to the compression chamber by a porting arrangement when the power assembly is in the vicinity of a designated rotational position thereof, and
   a first bisector line connecting the axes of the compressor rotors is inclined at an acute angle relatively to a second bisector line connecting the axes of the combustor rotors.

2. The internal combustion engine of claim 1, wherein
   the power assembly comprises a first power assembly, the compression chamber comprises a first compression chamber, the expansion chamber comprises a first expansion chamber, and the porting arrangement comprises a first porting arrangement,
   and further comprising a second power assembly including third and fourth intermeshing combustor rotors, each of which is rotatable about a respective axis, a second expansion chamber being formed at least partially around the third and fourth combustor rotors and increasing in size during a portion of each rotational cycle of the second power assembly under the power of a combustor event,
   wherein
   the second expansion chamber is connected to the second compression chamber by a second porting arrangement when the second power assembly is in a designated rotational position thereof, and
   a line connecting the axes of the third and forth combustor rotors is inclined at an acute angle relative to a line connecting the axes of the compressor rotors.

3. The internal combustion engine of claim 2, wherein the first and second power assemblies are phased such that, during a 360° rotational cycle of the compressor assembly, the top dead center positions of the first and second power assemblies are displaced approximately 180° relative to one another.

4. The internal combustion engine as recited in claim 2, wherein
   the first and second power assemblies are axially offset from and flank the compressor assembly and are isolated from the compressor assembly by first and second dividing walls, respectively, wherein
   each porting arrangement comprises an outlet port formed in one of the compressor rotors and opening into one of the compression chambers, an inlet port formed in one of combustor rotors and opening into one of the expansion chambers, and a cross passage extending through one of the dividing walls, and wherein each porting arrangement is valve-less.

5. The internal combustion engine as recited in claim 4, wherein the outlet and inlet ports of each porting arrangement are formed in an axial end surface of the associated compressor rotor and the associated combustor rotor, respectively, and wherein each cross passage has an inlet opening and an outlet opening that axially align with the associated outlet and inlet ports at designated points of the engine's operational cycle, and wherein each porting arrangement further comprises tubular seals that surround the outlet and inlet ports that extend axially from the associated compressor rotor and the associated combustor rotor, respectively, and that seal against the associated dividing wall, the seals preventing gas flow through the inlet and outlet ports except when the inlet and outlet ports are aligned with the cross passage.

6. The internal combustion engine of claim 2, wherein the third and fourth combustor rotors are coaxial with the first and second combustor rotors, respectively.

7. The internal combustion engine of claim 2, wherein the rotors of each rotor assembly mesh with a line of contact through at least a majority of each rotational cycle of each rotor assembly, wherein each rotor is substantially cylindrical and has a generally circular outer peripheral surface, and wherein each rotor of each rotor assembly has a radially protruding lobe that meshes with a radially extending recess in the other rotor of each rotor assembly.

8. The internal combustion engine of claim 7, wherein each rotor of the compressor assembly has two radially protruding lobes, each of which meshes with an associated radially extending recess in the other rotor of the compressor assembly once during each rotational cycle of the compressor assembly.

9. The internal combustion engine of claim 7, wherein each expansion chamber is formed by a volume extending, in a direction of rotation of the respective power assembly, from line of contact of the respective combustor rotors to the lobes of the respective combustor rotors, and further comprising first and second exhaust chambers, each of which is formed by a volume extending, in a direction of rotation of the respective power assembly, from the lobes of the respective combustor rotors to the line of contact of the respective combustor rotors.

10. The internal combustion engine as recited in claim 1, wherein the first bisector line is inclined between 20° and 70° relative to the second bisector line.

11. The internal combustion engine as recited in claim 10, wherein the first bisector line is inclined between 40° and 50° relative to the second bisector line.

12. The internal combustion engine as recited in claim 1, wherein the power assembly is isolated from the compressor assembly by a dividing wall, wherein the porting arrangement comprises an outlet port formed in one of the compressor rotors and opening into the compression chamber, an inlet port formed in one of combustor rotors and opening into the expansion chamber, and a cross passage extending through the dividing wall, and wherein the porting arrangement is valve-less.

13. The internal combustion engine as recited in claim 12, wherein the outlet and inlet ports of the porting arrangement are formed in an axial end surface of the associated compressor rotor and the associated combustor rotor, respectively, wherein the cross passage has an inlet opening and an outlet opening that align with the associated outlet and inlet ports at a designated point of the engine's operational cycle, and wherein the porting arrangement further comprises tubular seals that surround the outlet and inlet ports, that extend axially from the associated compressor rotor and the associated combustor rotor, respectively, and that seal against the associated dividing wall, the seals preventing gas flow through the inlet and outlet ports except when the cross passage is aligned with the inlet and outlet ports.

14. The internal combustion engine of claim 1, wherein the rotors of each rotor assembly mesh with each other via a line of contact through at least a majority of each rotational cycle of each rotor assembly, each rotor is substantially cylindrical and has a generally circular outer peripheral surface, wherein one rotor of each rotor assembly has a radially protruding lobe that meshes with a radially extending recess in the other rotor of the associated rotor assembly.

15. The internal combustion engine of claim 1, wherein the engine is a spark-ignited engine, and further comprising a spark plug that ignites the fuel in the expansion chamber.

16. The internal combustion engine of claim 1, further comprising a timing arrangement that interconnects the compressor assembly and the power assembly.

17. The internal combustion engine of claim 1, wherein the fuel source supplies fuel to a carburetor that forms an air/fuel mixture, and wherein the air that is admitted into the compressor assembly and compressed comprises part of the air/fuel mixture.

18. An internal combustion engine comprising:

(A) an engine housing;

(B) a compressor assembly housed in the engine housing and including first and second intermeshing compressor rotors, each of which is rotatable about a respective axis and each of which has i) a lobe that seals against the engine housing through the majority of a rotational cycle of the compressor assembly and ii) a recess that is engaged by the lobe of the other compressor rotor during a portion of the compressor assembly rotational cycle, a compression chamber being formed at least partially around the compressor rotors between a line of contact of the rotors and the lobes and decreasing in size during a portion of each rotational cycle of the compressor assembly to pressurize air in the compression chamber; and (C) first and second power assemblies each including first and second intermeshing combustor rotors, each of which is rotatable about a respective axis, and each of which has i) a lobe that seals against the engine housing through the majority of a rotational cycle of the power assembly and ii) a recess that is engaged by the lobe of the other combustor rotor during a portion of the power assembly rotational cycle, an expansion chamber being formed at least partially around the combustor rotors between a line of contact of the combustion rotors and the lobes and increasing in size during a portion of each rotational cycle of the power assembly under the power of a combustion event to power the engine; and (D) a fuel source that at least indirectly supplies fuel to the expansion chambers, wherein
the expansion chambers of the first and second power assemblies are periodically connected to the compressor assembly by first and second porting arrangements,
a first bisector line connecting the axes of the rotors of the first power assembly is parallel to a second bisector line connecting the axes of the rotors of the second power assembly,
a third bisector line connecting the axes of the compressor rotors is inclined at an acute angle relative to the first and second bisector lines, and
the first and second power assemblies are phased such that top dead center positions of the first and second power assemblies are displaced approximately 180° from one another.

19. A method comprising:
(A) admitting air into a compressor assembly, the compressor assembly having first and second intermeshing compressor rotors, each of which is rotatable about a respective axis, wherein
a first bisector line connecting the axes of the rotors of the first power assembly is parallel to a second bisector line connecting the axes of the rotors of the second power assembly, and
a third bisector line connecting the axes of the compressor rotors is inclined at an acute angle relative to the first and second bisector lines;
(B) rotating the compressor assembly to pressurize air contained therein; then
(C) transmitting the compressed air into an expansion chamber of a first power assembly, the first power assembly including first and second intermeshing combustor rotors, each of which is rotatable about a respective axis,
(D) using the air admitted into the combustion chamber of the first power assembly and a fuel charge, forming a first air/fuel mixture, the air/fuel mixture being formed in one of the expansion chamber and downstream of the compressor assembly; then
(E) igniting the fuel in the first air/fuel mixture to initiate a first expansion stroke to drive the first power assembly to rotate;
(F) in the vicinity of the initiation of the first expansion stroke, admitting air into the compressor assembly; then
(G) rotating the compressor assembly to pressurize the air contained therein; then
(H) transmitting the compressed air into an expansion chamber of a second power assembly, the second power assembly including first and second intermeshing combustor rotors, each of which is rotatable about a respective axis,
(I) using the air admitted into the expansion chamber of the second power assembly, forming a second air/fuel mixture, the air/fuel mixture being formed by mixing air with fuel in one of the expansion chambers of the second power assembly and a location downstream of the compressor assembly; and then
(J) igniting the fuel in the second air/fuel mixture to initiate a second expansion stroke to drive the second power assembly to rotate.

20. The method of claim 19, wherein
the compressor assembly has first and second compression chambers spaced peripherally of the compressor assembly, wherein
the first admitting step comprises admitting one of air and an air/fuel mixture into the first expansion chamber from the first compression chamber during a first portion of a rotational cycle of the compressor assembly, and wherein
the second admitting step comprises admitting one of air and an air/fuel mixture into the second expansion chamber from the second compression chamber during a second portion of the rotational cycle of the compressor assembly.

21. The method of claim 19, wherein the engine is a carbureted engine and the admitting step comprises admitting a fuel/air mixture into the compressor assembly.

* * * * *